US012321819B2

(12) United States Patent
Courtemanche et al.

(10) Patent No.: US 12,321,819 B2
(45) Date of Patent: Jun. 3, 2025

(54) APPARATUSES AND COMPUTER-IMPLEMENTED METHODS FOR GEOMETRIC IMAGE CROPPING FOR IMPROVED IMAGE PROCESSING

(71) Applicant: Hand Held Products, Inc., Charlotte, NC (US)

(72) Inventors: Jean-Luc Courtemanche, Charlotte, NC (US); Liu Hongyan, Charlotte, NC (US); Weihua Guan, Charlotte, NC (US); Li Jian, Charlotte, NC (US); Maryam Nikizad, Charlotte, NC (US); Javier Enrique Gonzalez Barajas, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/357,473

(22) Filed: Jul. 24, 2023

(65) Prior Publication Data

US 2024/0054306 A1 Feb. 15, 2024

(30) Foreign Application Priority Data

Aug. 12, 2022 (CN) .................. 202210971179.X

(51) Int. Cl.
*G06K 7/14* (2006.01)
(52) U.S. Cl.
CPC ......... *G06K 7/1443* (2013.01); *G06K 7/1413* (2013.01)
(58) Field of Classification Search
None
See application file for complete search history.

(56) References Cited

U.S. PATENT DOCUMENTS

| 8,596,541 | B2 | 12/2013 | Chiu et al. |
| 9,805,240 | B1 | 10/2017 | Zheng et al. |
| 11,350,024 | B1* | 5/2022 | Stallman ............... H04N 23/64 |

FOREIGN PATENT DOCUMENTS

| EP | 1690162 B1 | 1/2012 |
| WO | 2005/050390 A2 | 6/2005 |

OTHER PUBLICATIONS

Extended European Search Report Mailed on Jan. 24, 2024 for EP Application No. 23184980, 7 page(s).
Zebra Technologies, "Barcode Scanner Configuration Guide," http://www.zebra.com, 245 pages, (2015).

* cited by examiner

*Primary Examiner* — Kristy A Haupt
(74) *Attorney, Agent, or Firm* — Alston & Bird LLP

(57) ABSTRACT

Embodiments of the present disclosure relate to utilizing geometric image cropping for improved image processing. Such geometric image cropping improves efficiency and/or throughput of various image processing tasks, for example for reading a machine-readable symbology via a specially-configured scanner. Some embodiments generate cropping parameter(s) using raytracing projections from lens data and ranging data for use in cropping image(s). Some embodiments generate cropping parameter(s) using magnification estimation for use in cropping image(s). Generated cropping parameter(s) may be stored via a reader, for example to a range-parameter table, to efficiently be retrieved and utilized for cropping subsequently captured images while remaining accurate and efficient for image processing.

20 Claims, 16 Drawing Sheets

| Distance Parameter | Cropping Parameter(s) |
|---|---|
| 0.1 m | 100 |
| 0.3 m | 80 |
| 0.7 m | 55 |
| 1.0 m | 30 |
| 2.0 m | 20 |
| 6.0 m | 10 |
| 10.0 m | 5 |

APPARATUSES AND COMPUTER-IMPLEMENTED METHODS FOR GEOMETRIC IMAGE CROPPING FOR IMPROVED IMAGE PROCESSING

TECHNOLOGICAL FIELD

Embodiments of the present disclosure generally relate to improved image processing for barcode scanners, readers, and/or the like, and specifically to using improved geometric image cropping to improve image processing for such scanners, readers, and/or the like.

BACKGROUND

Various computing devices utilize image processing for any of a myriad of purposes. Scanners of machine-readable symbologies for example, such as barcode scanners, QR code readers, and the like, rely on image processing to successfully detect and decode a machine-readable symbology represented in the image. Successfully completing such image processing is key in ensuring that the system operates with sufficient efficiency and throughout.

Applicant has discovered problems with current implementations of image processing, particularly in contexts of the scanners for machine-readable symbologies. Through applied effort, ingenuity, and innovation, Applicant has solved many of these identified problems by developing embodied in the present disclosure, which are described in detail below.

BRIEF SUMMARY

In general, embodiments of the present disclosure provide for improvements in image processing for scanners. Other implementations for improved image processing for scanners will be, or will become, apparent to one with skill in the art upon examination of the following figures and detailed description. It is intended that all such additional implementations be included within this description be within the scope of the disclosure, and be protected by the following claims.

In one aspect of the disclosure, a computer-implemented method is provided. The computer-implemented method is provided for geometric image cropping. The computer-implemented method is executable via any of the one or more computing device(s) embodied by hardware, software, firmware, and/or a combination thereof as described herein. In some example embodiments, the example computer-implemented method includes receiving a captured image via an imager. The computer-implemented method further includes identifying at least one cropping parameter associated with the imager. The computer-implemented method further includes cropping the captured image based at least in part on the at least one cropping parameter to generate a cropped image. The example computer-implemented method further includes applying the cropped image to an image deconvolution algorithm to generate a processed image.

In some embodiments of the example computer-implemented method, the example computer-implemented method further includes outputting the processed image to an image processing algorithm, where the image processing algorithm includes a machine-readable symbology reading algorithm.

In some embodiments of the example computer-implemented method, the example computer-implemented method further includes altering a current focus of a lens associated with the imager, and generating the at least one cropping parameter based at least in part on the current focus of the lens.

In some embodiments of the example computer-implemented method, identifying the at least one cropping parameter associated with the imager includes identifying ranging data associated with the imager, identifying lens data associated with the imager, applying the ranging data and the lens data to an image raytracing function to generate constructed image data, and determining the at least one cropping parameter based at least in part on the constructed image data. In some such embodiments of the example computer-implemented method, the example computer-implemented method further includes storing the at least one cropping parameter to a range-parameter table.

In some embodiments of the example computer-implemented method, identifying the at least one cropping parameter associated with the imager includes identifying ranging data associated with the imager, identifying code size data associated with the imager, applying the ranging data and the code size data to an image magnification estimation function to generate estimated image data, and determining the at least one cropping parameter based at least in part on the estimated image data. In some embodiments of the example computer-implemented method, the example computer-implemented method further includes storing the at least one cropping parameter to a range-parameter table.

In some embodiments of the example computer-implemented method, the image deconvolution algorithm includes a lens point spread function.

In some embodiments of the example computer-implemented method, identifying the at least one cropping parameter associated with the imager includes identifying ranging data associated with the imager, and determining, from a range-parameter table, the at least one cropping parameter.

In some embodiments of the example computer-implemented method, the at least one cropping parameter based at least in part on a largest code size readable via the apparatus.

In some embodiments of the example computer-implemented method, the at least one cropping parameter is based at least in part on an aimer position.

In some embodiments of the example computer-implemented method, the imager includes at least one lens, and where the at least one cropping parameter is based at least in part on lens data associated with the at least one lens.

In another aspect of the disclosure, an apparatus is provided. The apparatus is provided for geometric image cropping. In some example embodiments of the apparatus, the apparatus includes at least one memory and at least one processor, the at least one memory having computer-coded instructions stored therein that, in execution with the at least one processor, cause the apparatus to perform each step of any one of the example computer-implemented methods described herein. In another example embodiments of the apparatus, the apparatus includes means for performing each step of any one of the computer-implemented methods described herein.

In another aspect of the disclosure, a computer program product is provided. The computer program product is provided for geometric image cropping. In some example embodiments of the computer program product, the computer program product includes at least one non-transitory computer program code that, in execution via at least one processor, configures the computer program product for performing each step of any one of the example computer-implemented methods described herein.

BRIEF DESCRIPTION OF THE DRAWINGS

Figure 1:
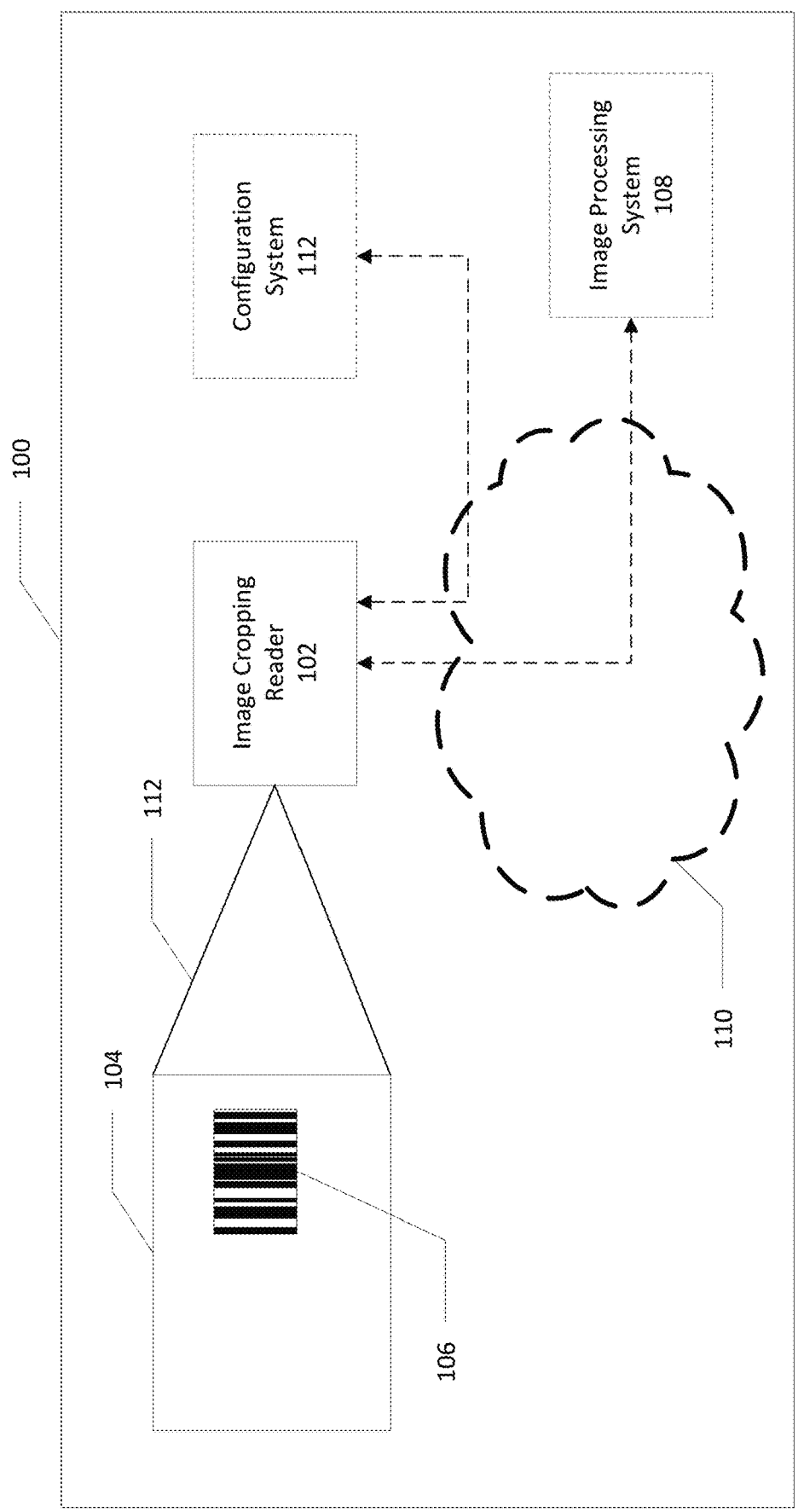
Figure 2A:
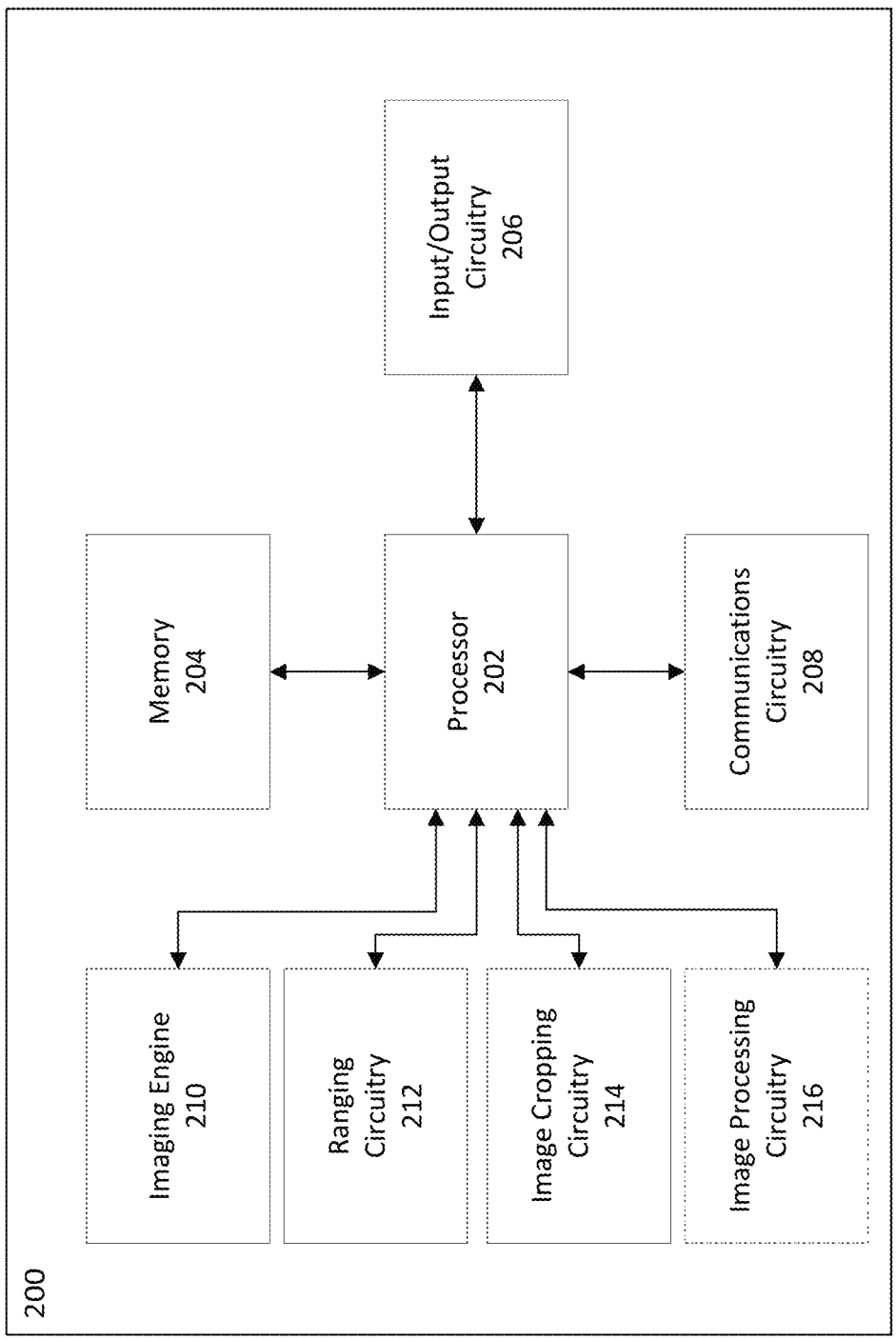
Figure 2B:
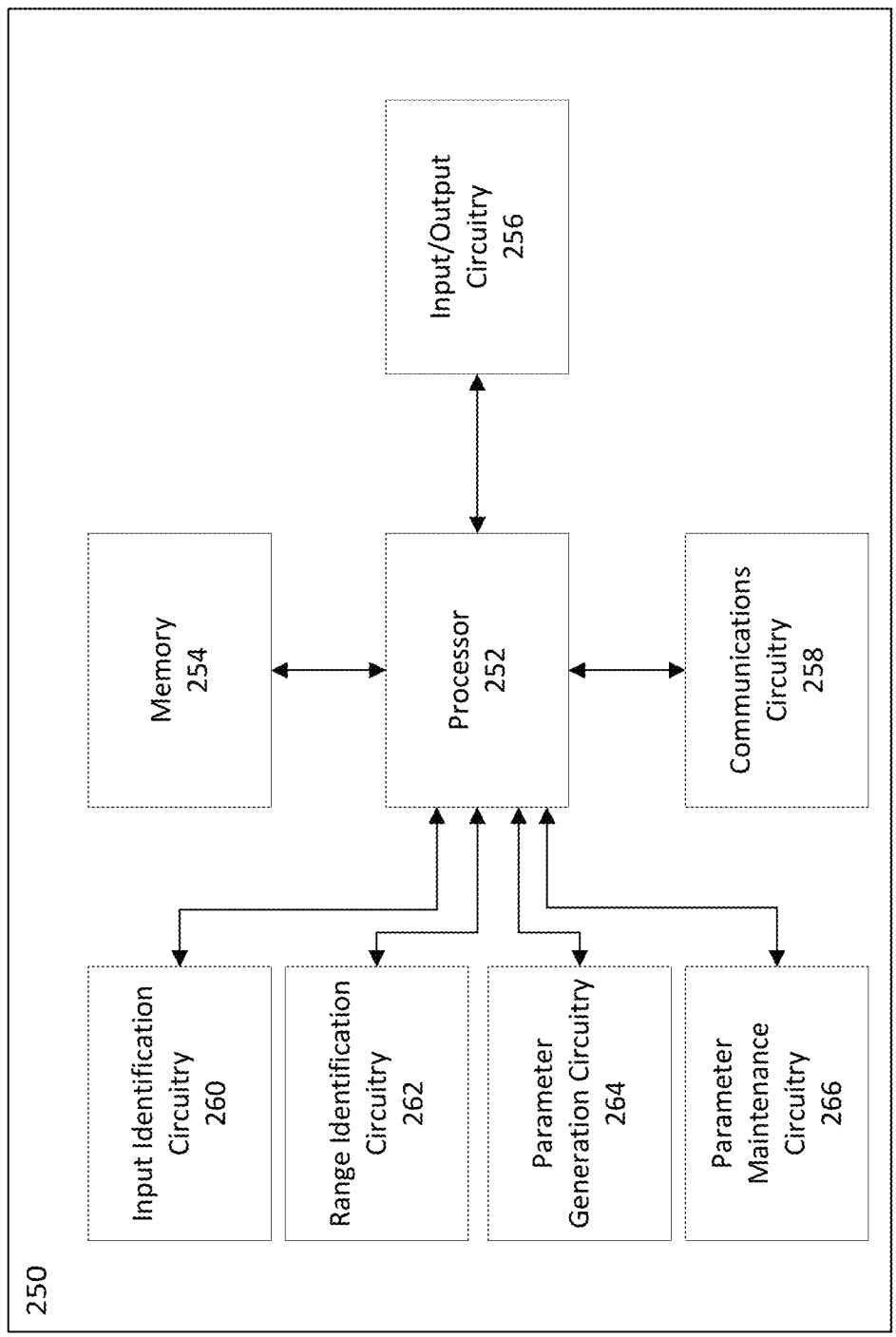
Figure 3:
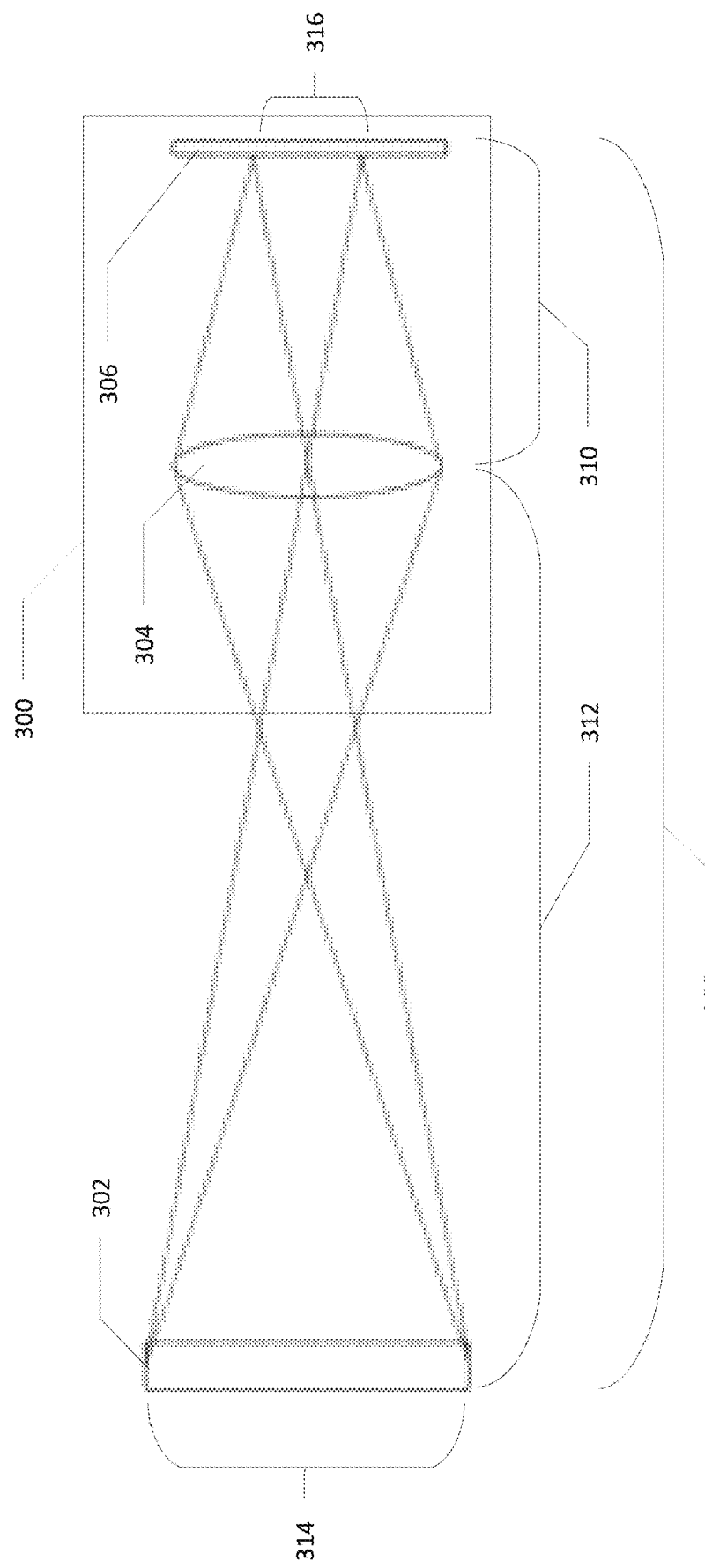
Figure 5:
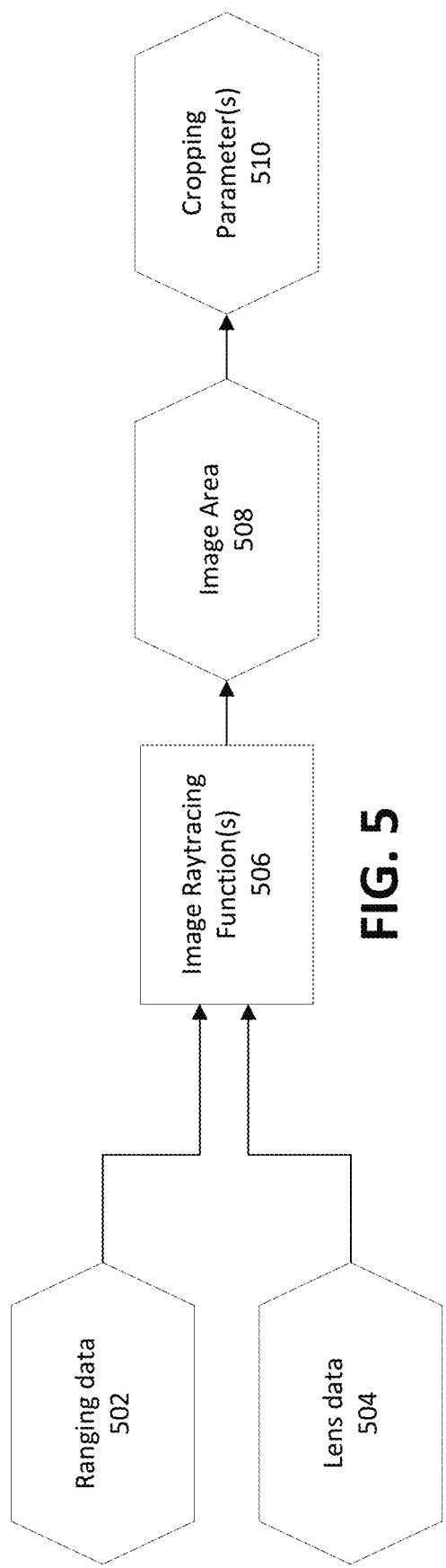
Figure 6:
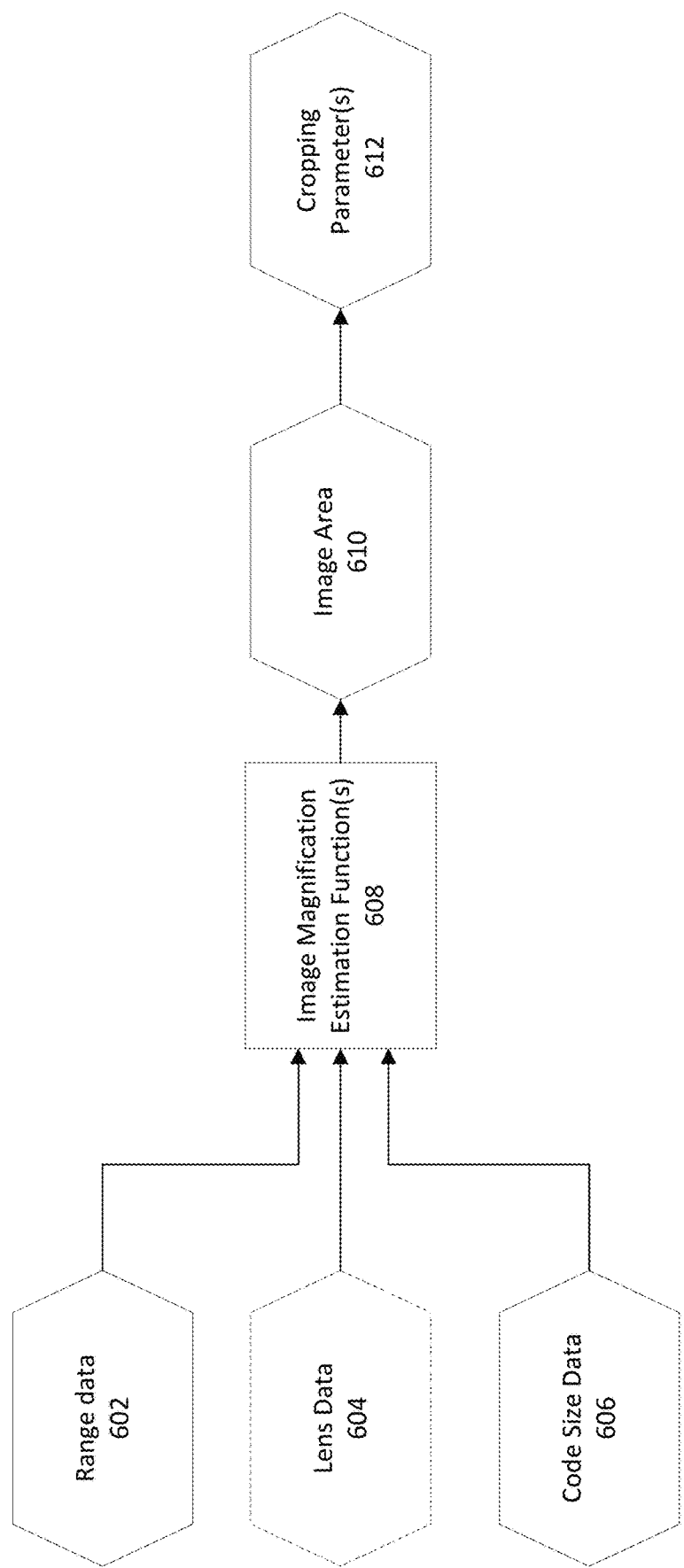
Figure 7:
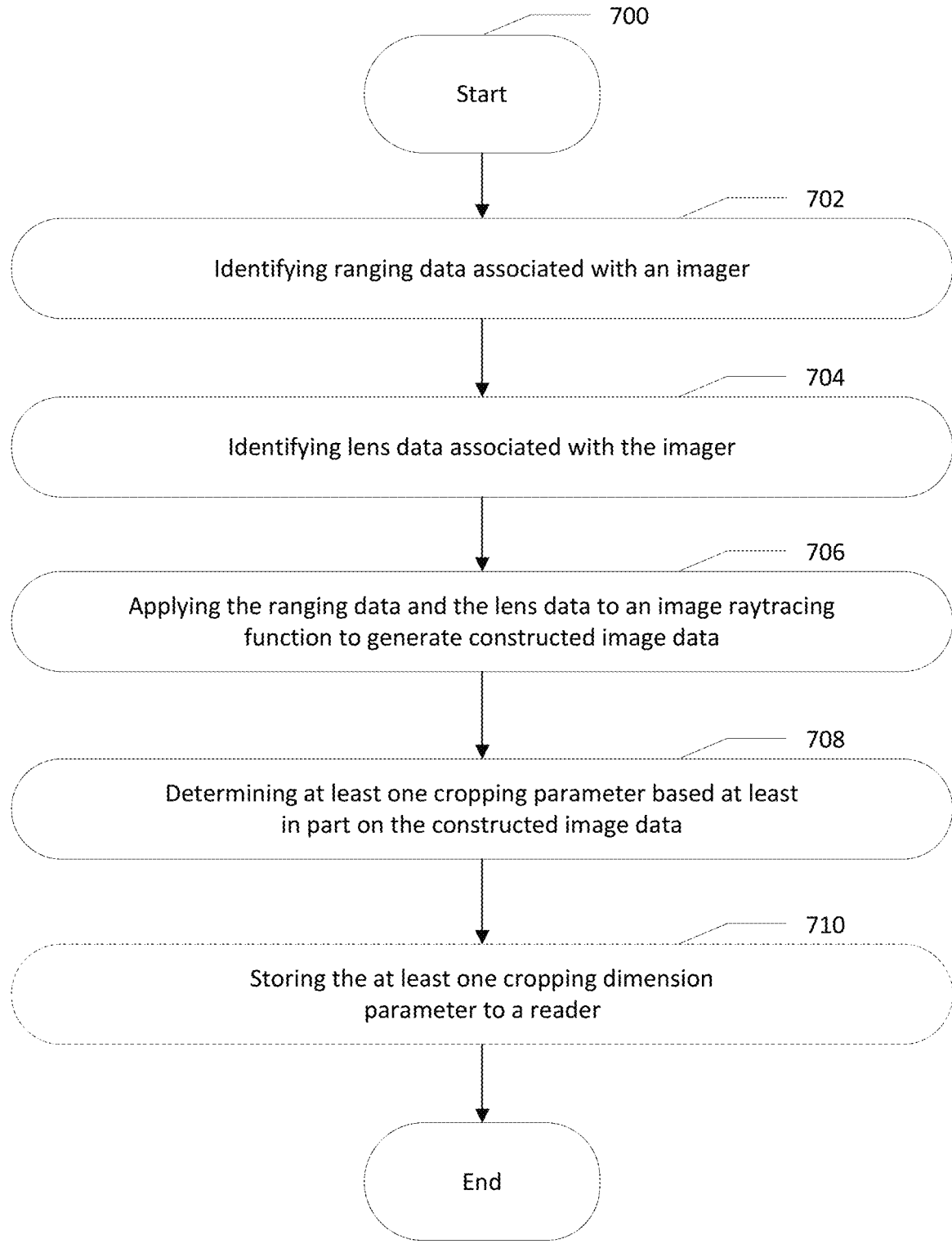
Figure 8:
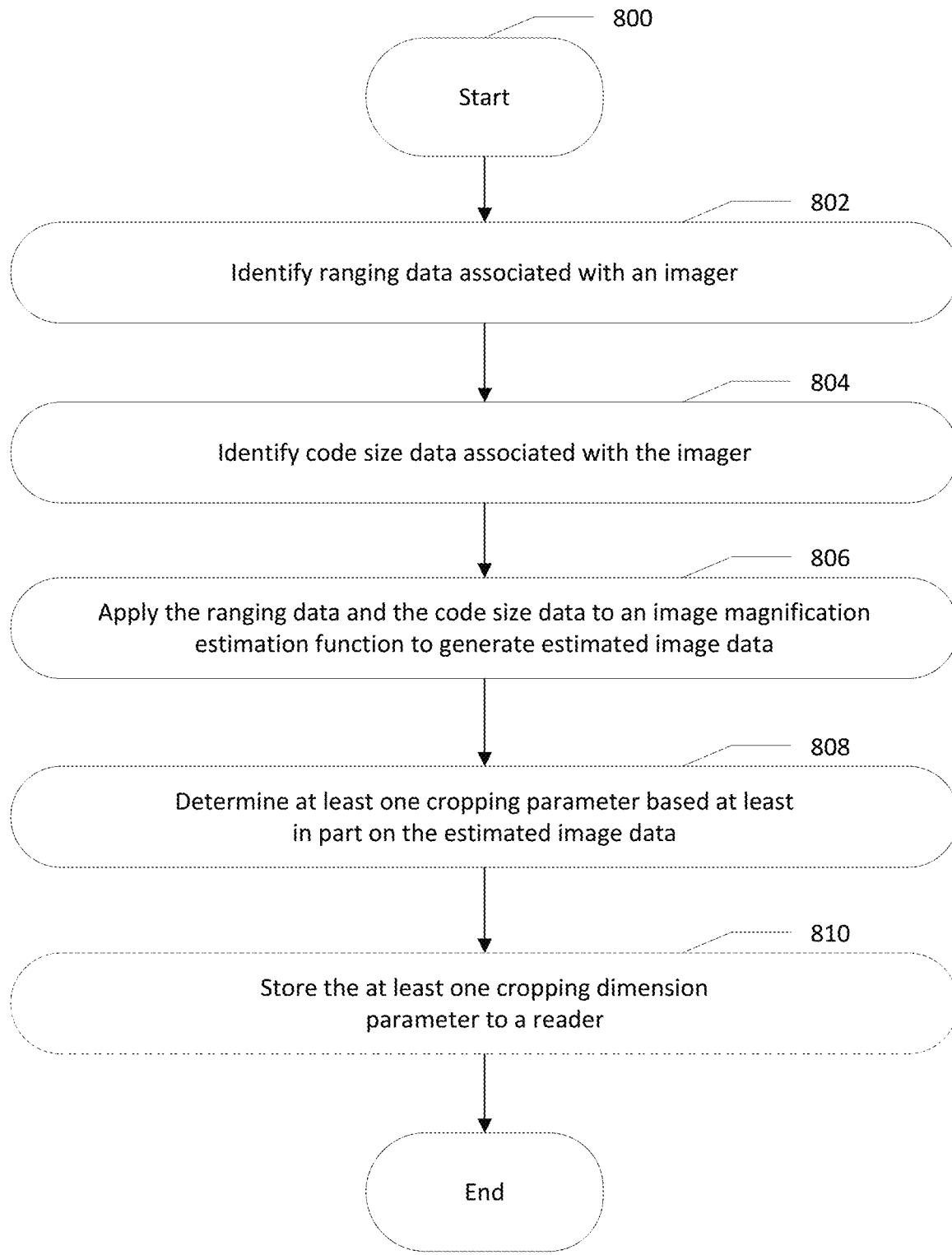
Figure 9:
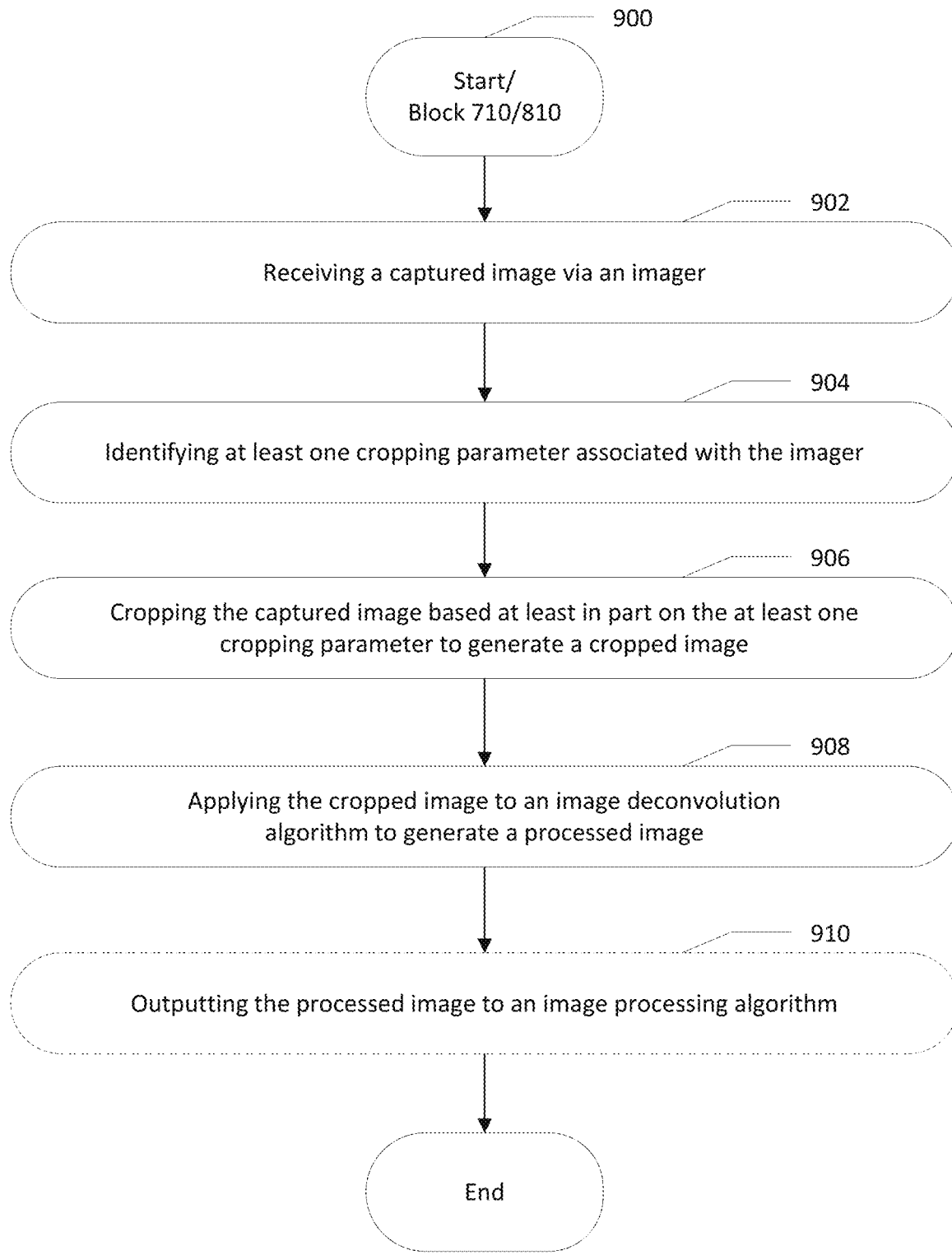
Figure 10:
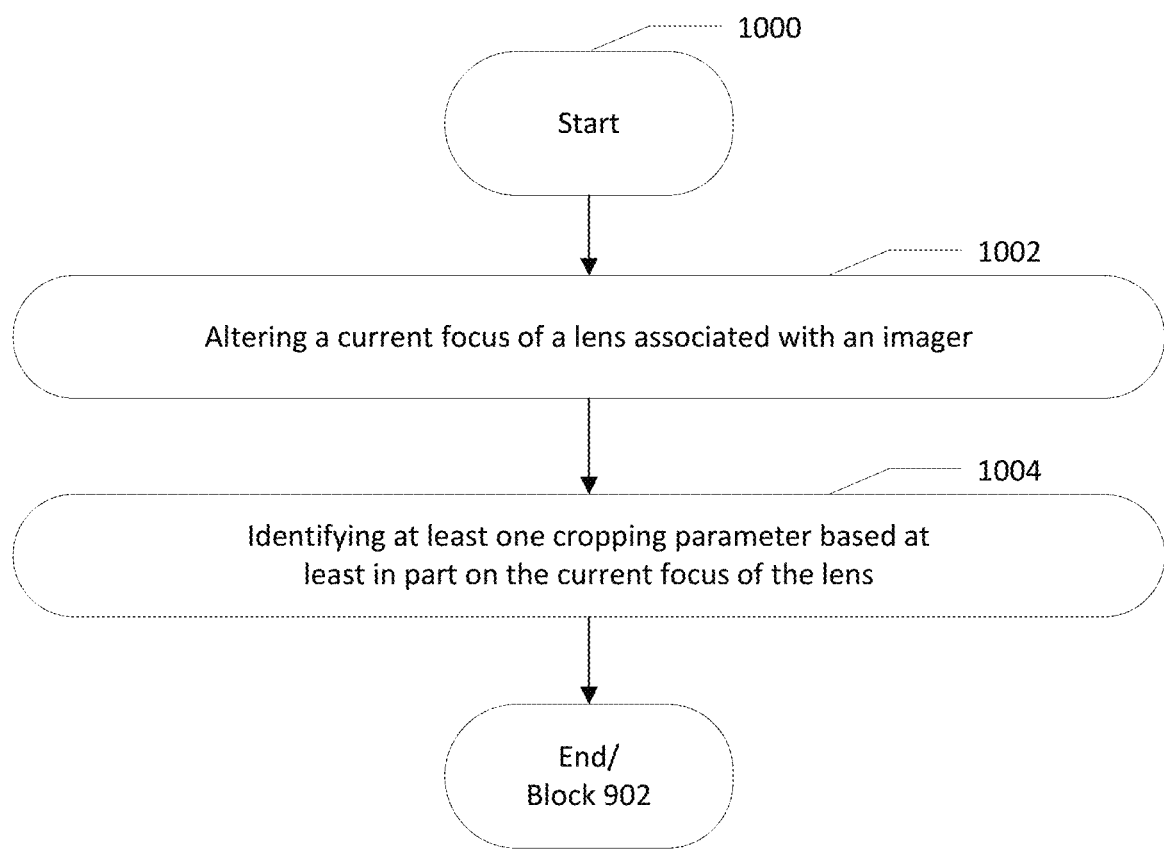
Figure 11:
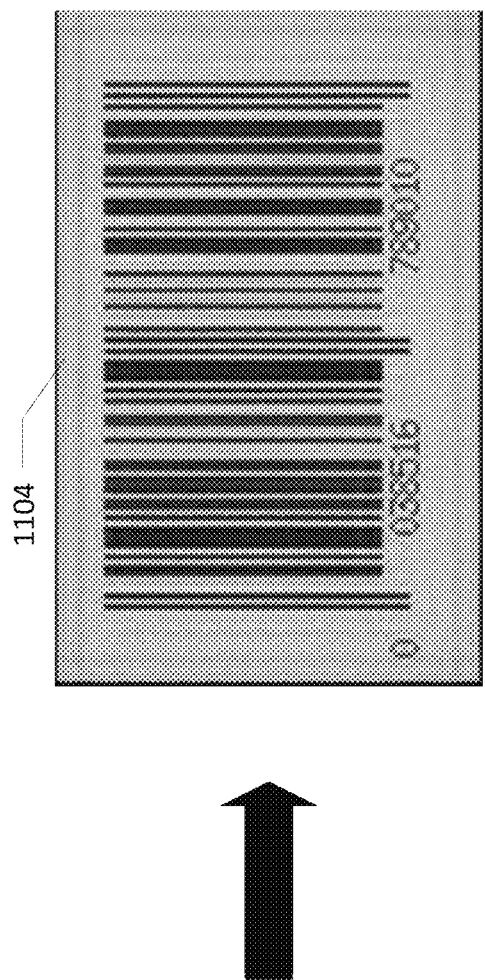
Figure 11:
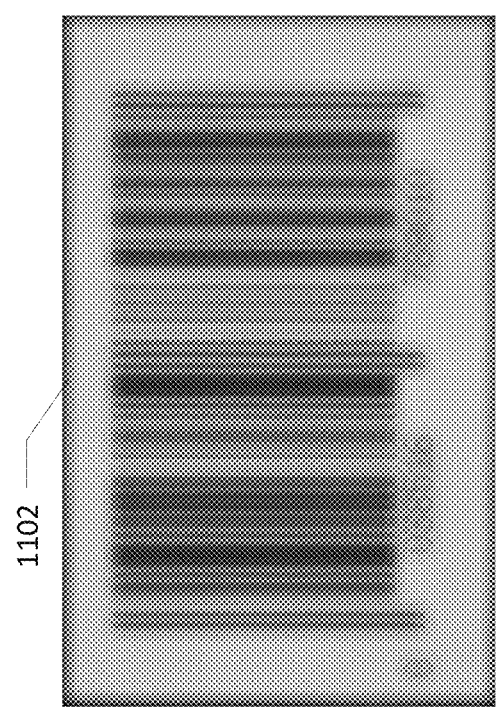
Figure 12:
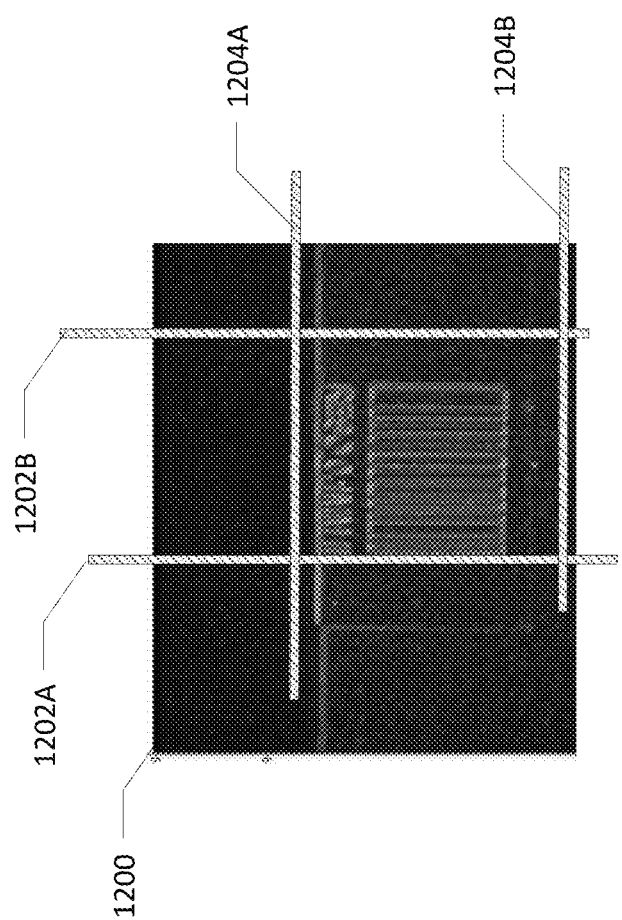
Figure 13:
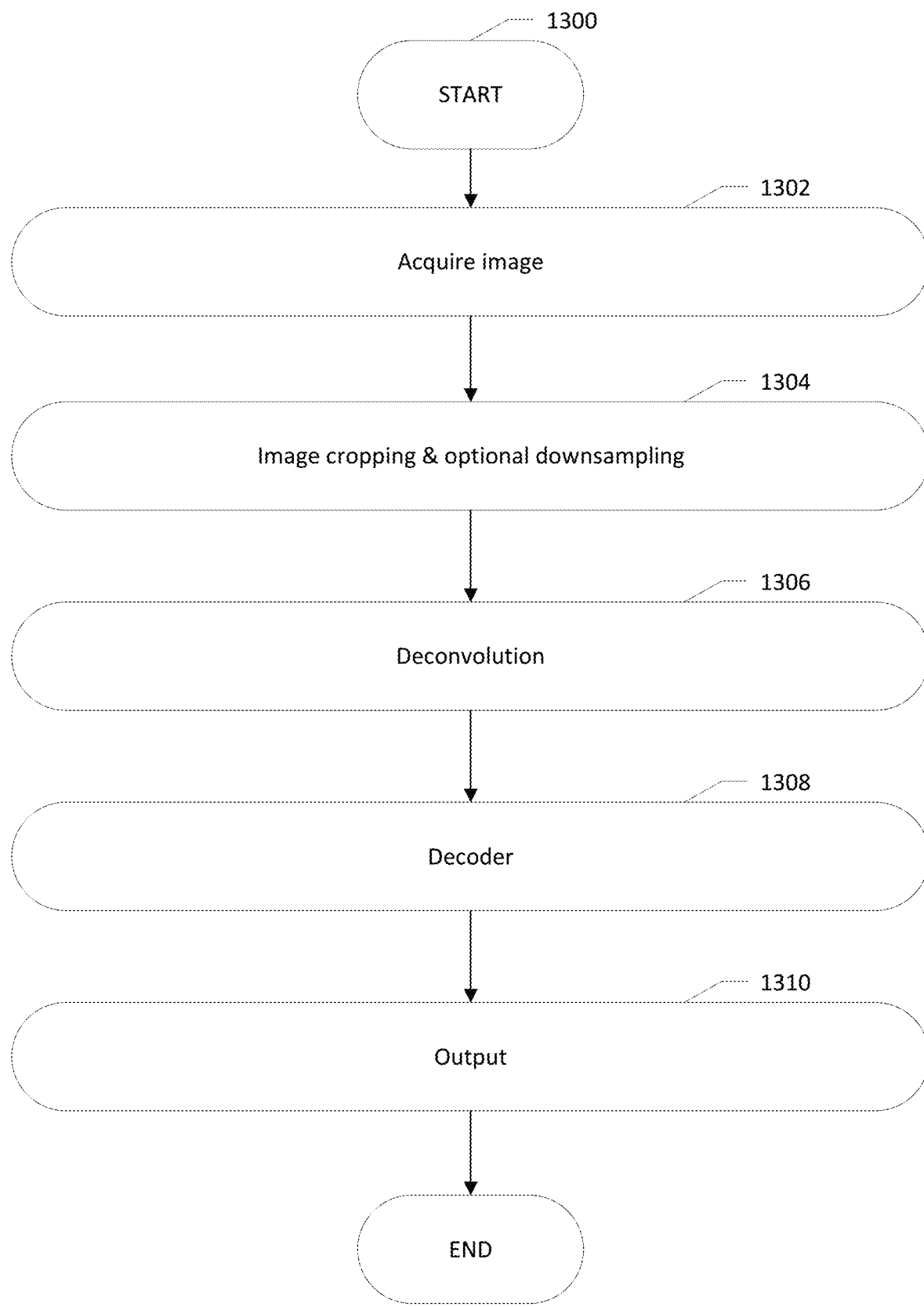
Figure 14:
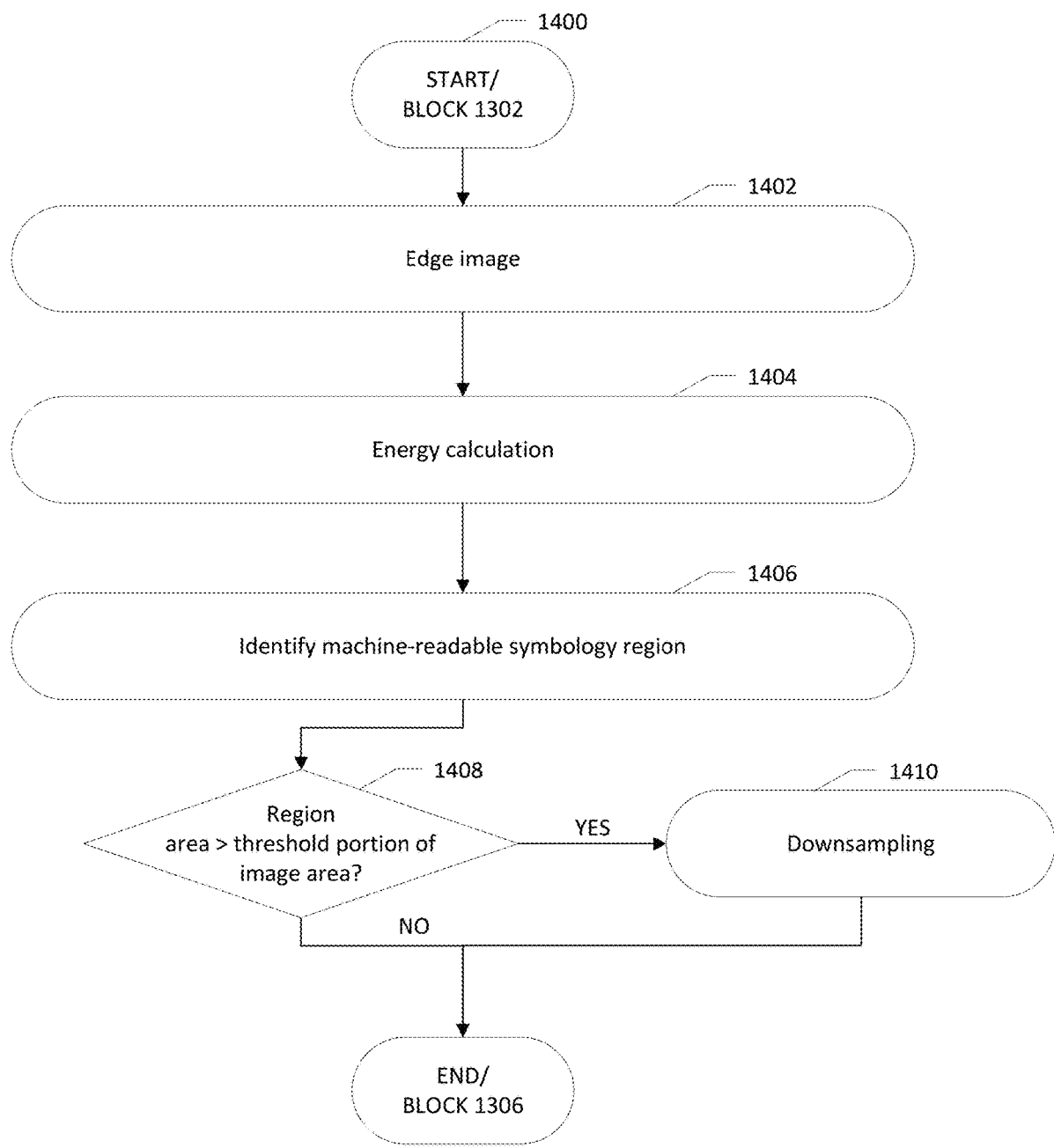
Figure 15:
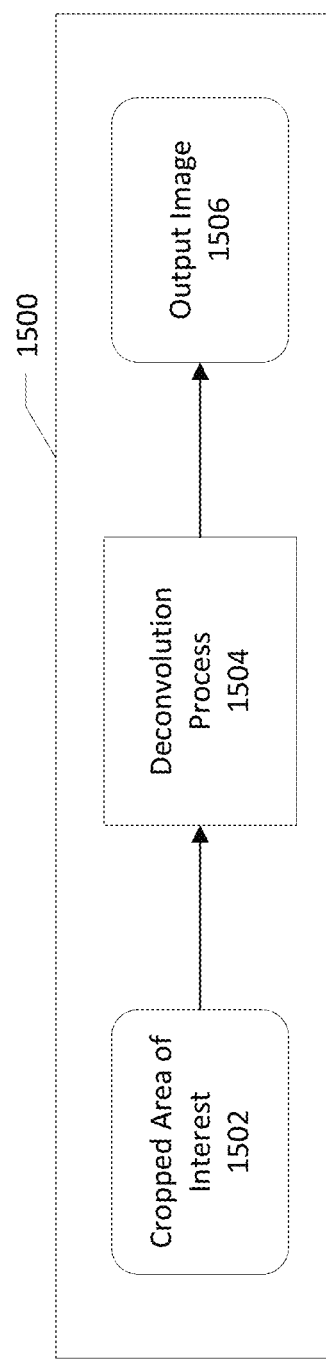

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2A illustrates a block diagram of an example apparatus that may be specially configured in accordance with an example embodiment of the present disclosure;

FIG. 2B illustrates a block diagram of another example apparatus that may be specially configured in accordance with an example embodiment of the present disclosure;

FIG. 3 illustrates a visualization of an example imager arrangement with raytracing in accordance with at least one example embodiment of the present disclosure;

FIG. 4 illustrates an example range-parameter table in accordance with at least one example embodiment of the present disclosure;

FIG. 5 illustrates an example data flow to generate cropping parameter(s) in accordance with at least one example embodiment of the present disclosure;

FIG. 6 illustrates an example data flow to generate a cropping parameter(s) in accordance with at least one example embodiment of the present disclosure;

FIG. 7 illustrates a flowchart depicting example operations of a process for determining at least one cropping parameter using an image raytracing function in accordance with at least one example embodiment of the present disclosure;

FIG. 8 illustrates a flowchart depicting example operations of a process for determining at least one cropping parameter using an image magnification estimation function in accordance with at least one example embodiment of the present disclosure;

FIG. 9 illustrates a flowchart depicting example operations of a process for cropping based on at least one cropping parameter in accordance with at least one example embodiment of the present disclosure;

FIG. 10 illustrates a flowchart depicting example operations of a process for identifying at least one cropping parameter based on a variable focus in accordance with at least one example embodiment of the present disclosure;

FIG. 11 illustrates an example visualization of deblurring of an image utilizing deconvolution process(es) in accordance with at least one example embodiment of the present disclosure;

FIG. 12 illustrates an example of edge detection for image cropping in accordance with at least one example embodiment of the present disclosure;

FIG. 13 illustrates a flowchart depicting example operations of a process for image processing in accordance with at least one example embodiment of the present disclosure;

FIG. 14 illustrates a flowchart depicting example operations of a process for image cropping as part of a process for image processing in accordance with at least one example embodiment of the present disclosure; and FIG. 15 illustrates a flowchart depicting example operations of a process for image deconvolution as part of a process for image processing in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, images are captured and processed for particular purposes. For example, in the context of scanning machine-readable symbologies (e.g., barcodes, QR codes, and/or the like), one or more image(s) may be captured and subsequently processed in an attempt to detect and decode machine-readable symbologies within such image(s). To improve the throughput and/or rate of operation to complete scanning operations, readers that perform such operations quickly and accurately are desirable.

Multiple factors may impact how long a particular reader takes to complete a scanning operation. One such factor is images size, as processing time for a particular image increases as image size increases. Even when a large image size is captured, however, the image often only includes a small portion of data that corresponds to the machine-readable symbology for processing. Processing the entirety of the image often results in wasted computing time and resources, since much of the image is likely to include non-relevant data before a portion corresponding to the machine-readable symbology is actually processed. This proportion of wasted space to relevant space (e.g., corresponding to a machine-readable symbology) changes at various distances to a target object as well, such that the proportion of wasted space increases as the distance between the target object and the scanner increases. Nevertheless, even at these further distances, scanners often process an entirety of a captured image regardless, resulting in even more wasted time spent processing the image before successfully detecting and/or decoding a machine-readable symbology.

Attempts may be made to try and crop an image before processing. Certain existing technologies—such as image cropping based on edge detection and/or machine learning implementations alone—may be utilized to crop an image before further processing. Such methodologies, however, trade off processing time associated with image processing for processing time associated with pre-processing the image to achieve such cropping. For example, edge detection-based cropping and/or machine learning-based cropping may take between 100 and 500 milliseconds ("ms") to complete for a 1 megapixel ("MP") image via a 1 GHz dual core CPU of a scanner. This amount of time needed to complete the cropping alone does not sufficiently meet the reading time of such scanners, which often is less than 100 ms. Accordingly, alternatively methodologies for pre-processing an image for further processing is desired.

Embodiments of the present disclosure crop a captured image based at least in part on at least one cropping parameter storable to a memory of a scanner. The at least one cropping parameter may be retrievable from the memory of the scanner for use in cropping a captured image utilizing the at least one cropping parameter. For example, the at least one cropping parameter may represent a percentage of image height and/or width to be cropped from the captured image. In this regard, the at least one cropping parameter may quickly be retrieved from the memory and utilized for such cropping without requiring significant pre-processing time spent on complex pre-processing, for example such that image cropping may be accomplished in less than 1 ms.

In some embodiments, a scanner includes a rangefinder that enables determination of a range to a target object. For example, a laser aimer of the scanner may be utilized to orient the scanner by positioning the laser onto a machine-readable symbology on a target object. In some embodiments, ranging data identified via the rangefinder is utilized to determine the at least one cropping parameter to be utilized for cropping. The ranging data in some such embodiments represents a distance to the target object, where the distance is utilized to retrieve particular at least one cropping parameter from a set of selectable at least one cropping dimension. In this regard, in some such embodiments different cropping parameter(s) may be identified at different distances from the target object, for example such that more image data may be cropped as the distance increases without affecting the rate at which such cropping may be completed.

At least one cropping parameter in some embodiments is determinable and subsequently storable to a memory of a scanner for subsequent use. In some embodiments, the at least one cropping parameter is determined using an image raytracing function or other image magnification estimation function. In some such embodiments, boundary points for a machine-readable symbology may be determined during a process for determining the at least one cropping parameter. Raytracing from the boundary points may be utilized to generate constructed image data embodying an image area of an image sensor that corresponds to the representation of the machine-readable symbology. In this regard, in some embodiments the at least one cropping parameter may be generated such that the image area corresponding to the machine-readable symbology is cropped out of the whole of the captured image by the image sensor.

The determination of the at least one cropping parameter can be estimated based on code size data associated with the machine-readable symbology and magnification factors of the scanner. In some embodiments, code size data corresponding to a largest machine-readable symbology processable by a particular scanner is utilized to estimate a corresponding image area of the image sensor that represents the machine-readable symbology at a particular range. For example, at least one cropping parameter in some embodiments is determined as a double an image area determined for a particular machine-readable symbology.

Some embodiments generate and/or store at least one cropping parameter associated with ranging data representing a particular distance. Some embodiments generate a range-parameter table including at least one cropping parameter associated with each range represented in a plurality of ranging data. In this regard, some embodiments determine and store specially configured range-crop table to one or more scanner(s) for use in subsequent scanning operations. Accordingly, based at least in part on ranging data identified in real-time for a particular scanner, at least one cropping parameter corresponding to the ranging data identified may be determined from the range-crop dimension table as described herein.

The embodiments described herein provide a myriad of technical advantages. Efficiently cropping a captured image utilizing the generated and stored cropping parameter(s) described herein enables such cropping to occur with minimal overhead, extra use of computing resources, and improved throughput. Additionally, by utilizing the cropped image, subsequent processing operations (e.g., for image deconvolution and/or image processing) are similarly performed with increased throughput and decreased utilized computing resources. In the context of detecting and decoding machine-readable symbologies, for example, such a reduction in the time required to crop and process a captured image results in overall improved time to successful completion of detecting and decoding (where such detecting and decoding embodies "reading" of a machine-readable symbology) the machine-readable symbologies (e.g., successful time to complete barcode scanning). In circumstances where speed to deconvolution can be reduced to 20%, for example for a dual core 1 GHz CPU processing a 1 megapixel image captured at a range of 2 meters, such reading can be performed with time-to-completion improved by a factor of five.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular networked device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user," and "client," refers to an individual or entity that is a source of operation for a reader.

The term "client device" refers to computer hardware, software, and/or firmware that is configured to access a service made available by a server. The server is often (but not always) executed on another computer system, in which case the client device accesses the service by way of a network. Non-limiting examples include a reader, or a user device communicatively coupled with a reader, for example a smart phone, tablet computer, laptop computer, wearable, personal computer, enterprise computer, and/or the like.

The term "machine-readable symbology" refers to any visually represented encoded data that is detectable and decodable utilizing computer-implemented process(es). Non-limiting examples of a machine-readable symbology include a 2D barcode, a 3D barcode, a quick response code, a Datamatrix code, and an encoded image.

The term "geometric image cropping" refers to one or more computer-implemented process(es) that crops a captured image based at least in part on cropping parameter(s) derived from an image area of a sensor that is derived from a size of a machine-readable symbology impacting the sensor at a particular range from the machine-readable symbology.

The term "imager" refers to one or more optical component(s) aligned with an image sensor that enables the image sensor to capture an image representing a particular field of view defined by the image sensor in alignment with the optical component(s).

The term "cropping parameter" refers to electronically managed data that represents an amount to crop from at least one dimension of a captured image. Non-limiting examples of a cropping parameter include a percentage, a multiplier, and/or an absolute or relative reduction to apply to a particular dimension of an image.

In some embodiments, a cropping parameter is associated with a particular dimension, for example a cropping parameter associated with a height dimension of a captured image, such that the cropping parameter is utilized to crop the height dimension only. A plurality of cropping parameters may each be associated with a different dimension, for example a first cropping parameter associated with a height dimension and a second cropping parameter associated with a width dimension, such that the first cropping parameter is utilized to crop the height dimension and the second dimension parameter is utilized to crop the width dimension of the captured image. In some embodiments, a single cropping parameter is applied to a plurality of dimensions, for example such that the single cropping parameter is utilized to crop height and width dimensions of the image.

The term "captured image" refers to electronically managed data representing a captured depiction of a field of view. A captured image is output via an image sensor of an imager that captures image data based at least in part on attenuation of light onto the image sensor from within the field of view.

The term "cropped image" refers to a portion of image data extracted from a captured image based at least in part on cropping parameter(s) usable to derive portion(s) of the captured image to be removed during cropping.

The term "image deconvolution algorithm" refers to any computer-implemented process(es) that pre-processes image data to de-blur, improve resolution, and/or otherwise configure such image data for processing associated with detecting and/or decoding a machine-readable symbology.

The term "processed image" refers to image data outputted by an image deconvolution algorithm.

The term "image processing algorithm" refers to one or more computer-implemented process(es) that accomplish a particular image processing task.

The term "machine-readable symbology reading algorithm" refers to an image processing algorithm that attempts to detect at least one machine-readable symbology from image data, and attempt to decode at least one machine-readable symbology detected by processing the image data. Each successfully completed detection and decoding of a machine-readable symbology is referred to as a "scanning operation."

The term "lens" refers to one or more optical component(s) that define a field of view capturable via at least one image sensor.

The term "lens data" refers to a property or multiple properties of a lens that affects how the lens interacts with light.

The term "current focus" with respect to a particular lens refers to a current focal distance associated with an imager based on a current position of a lens.

The term "ranging data" refers to electronically managed data representing a distance from an image sensor to a particular point. In some embodiments, the ranging data is generated by a rangefinder. In some embodiments, the particular point corresponds to a location of an aimer on a target object.

The term "image raytracing function" refers to one or more computer-implemented process(es) that generate projected ray traces of light from a location associated with a machine-readable symbology to a location on an image sensor.

The term "constructed image data" refers to electronically managed data corresponding to data outputs from locations on an image sensor that are projected via raytracing and determined to represent a ray of light associated with a machine-readable symbology.

The term "range-parameter table" refers to a data structure that stores pairs between ranging data and at least one corresponding cropping parameter. A cropping parameter stored in a range-parameter table is retrievable based on a value of particular ranging data, such that the ranging data serves as a key for retrieving a particular pairing in the range-parameter table.

The term "code size data" refers to electronically managed data that represents one or more dimensions of a particular machine-readable symbology.

The term "image magnification estimation function" refers to one or more computer-implemented process(es) that estimate the image area of a particular machine-readable symbology based on code size data associated with the machine-readable symbology and lens data associated with a lens of an imager.

The term "estimated image data" refers to dimension data of an image area generated based at least in part on the output of an image magnification estimation function.

The term "lens point spread function" refers to the effects of an imager on light of a point source defining a particular location at a target object.

The term "largest code size" with respect to a particular imager refers to electronically managed data that represents the greatest value dimensions of a code that a particular imager is rated to capture and process. In some embodiments, a largest code size readable by a particular imager is predetermined based on configuration of the image sensor of the imager.

The term "aimer position" refers to a location of an aimer laser on a target object.

Example Systems and Apparatuses of the Disclosure

FIG. 1 illustrates a block diagram of a system that may be specially configured within which embodiments of the present disclosure may operate. Specifically, FIG. 1 depicts an example system 100. The example system 100 includes a specially configured image cropping reader 102 that interacts with a particular object 104 having a machine-readable symbology 106 thereon. The system 100 further includes an optional image processing system 108, which is communicable with the image cropping reader 102 over an optional communications network 110.

The object 104 may be any object on which a machine-readable symbology may be printed, affixed, associated with, or otherwise linked. In some embodiments, the object 104 is a surface upon which a machine-readable symbology may be printed. Alternatively or additionally, in some embodiments, the object 104 is an item, box, or the like. The machine-readable symbology 106 in some embodiments is printed on a label affixed to the object, for example using an adhesive, screw, nail, staple, or other securing mechanism, or the like. It will be appreciated that the object 104 may be any shape, size, and/or type of object. For brevity and clarity of the description and figures, the object 104 is depicted as a rectangular prism and the machine-readable symbology 110 is depicted as a barcode, however, in other embodiments the object 104 may be another type of object and/or the machine-readable symbology 106 may be another type of machine-readable symbology.

In some embodiments, the machine-readable symbology 106 encodes data, such that successful detection and decoding of the machine-readable symbology 106 is usable to retrieve the data encoded thereby. Non-limiting examples of a machine-readable symbology 106 include any one-dimension, two-dimensional, and/or three-dimensional code. The machine-readable symbology 106 may or may not be visibly distinguishable by a human, but is detectable and/or decodable by one or more computing device(s), as described further herein. In some embodiments, the machine-readable symbology 106 encodes data associated with the object 104 upon which it is printed or affixed. For example, the machine-readable symbology 106 in some embodiments encodes an object identifier, size data, object type, and/or other information associated with the object 104. It will be appreciated, however, that the machine-readable symbology 106 may represent any desired data.

The image cropping reader 102 includes one or more computing device(s) that captures at least one field of view. In some embodiments, the image cropping reader 102 embodies a mounted or hand-held reader of machine-readable symbologies, for example a barcode scanner or the like. In some embodiments, the image cropping reader 102 includes at least one imager, each imager defining a particular field of view capturable utilizing an image sensor and associated optical component(s). In some embodiments, the image cropping reader 102 includes two imagers, each configured to capture a different field of view, for example a far field of view and a near field of view. It will be appreciated that in other embodiments, the image cropping reader 102 includes imagers for capturing a different number of fields of view. For example, in some embodiments, the image cropping reader 102 captures a single field of view. In some other embodiments, the image cropping reader 102 includes a plurality of imagers for capturing two fields of view, three fields of view, or more. In some embodiments, the image cropping reader 102 includes one or more illuminator(s) that produce illumination(s) for brightening the particular field(s) of view capturable by the image cropping reader 102. As illustrated, the image cropping reader 102 includes one or more imager(s) configured to illuminate and/or capture a particular field of view 112.

In some embodiments, the image cropping reader 102 includes an imager at fixed focus. Alternatively or additionally, in some embodiments, the image cropping reader 102 includes an imager associated with a variable focus. For example, in some embodiments the image cropping reader 102 includes a moveable lens that enables altering a focal range of an imager. In this regard, the field of view 112 may be altered as the focal range of the image cropping reader 102 is updated.

In some embodiments, the image cropping reader 102 stores cropping parameter(s). For example, in some embodiments the image cropping reader 102 stores cropping parameter(s) derived by an external system, for example via one or more of the process(es) described herein. In some embodiments, the image cropping reader 102 maintains at least one stored cropping parameter associated with ranging data for use based at least in part on real-time ranging data during operation of the image cropping reader 102.

The image cropping reader 102 is specially configured to capture image data and crop the captured image data based at least in part on cropping parameter(s) retrieved from the image cropping reader 102. In this regard, the image cropping reader 102 may retrieve the at least one cropping parameter from a memory accessible to the image cropping reader 102. For example, in some embodiments, the image cropping reader 102 stores at least one cropping parameter for use in cropping each captured image. Alternatively or additionally, in some embodiments, the image cropping reader 102 determines, in real-time, ranging data that represents a distance between the image sensor of the image cropping reader 102 and the object 104 upon which a particular point of rangefinder utilized for ranging is positioned. In some such embodiments, the image cropping reader 102 retrieves particular at least one cropping parameter based at least in part on the real-time determined ranging data. Utilizing the at least one cropping parameter identified by the image cropping reader 102, the image cropping reader 102 subsequently may crop the captured image accordingly to generate a cropped image. The cropped image may be processed accordingly, for example for a particular image processing task, via the image cropping reader 102 or an external system.

In some embodiments, the image cropping reader 102 is configured utilizing particular methodologies that enable operation utilizing the cropping parameter(s), for example. In some embodiments, the image cropping reader 102 is configured by one or more system(s), such as by the configuration system 112. The image cropping reader 102 in some embodiments is configured by installing, configuring, storing, and/or updating hardware, firmware, and/or software of the image cropping reader 102. For example, in some embodiments, the image cropping reader 102 includes firmware configured before the image cropping reader 102 is transferred to an end user, where the firmware includes cropping parameter(s) generated as described herein.

In some embodiments, the system 100 optionally further includes the configuration system 112. The configuration system 112 includes one or more computing device(s) embodied in hardware, software, firmware, and/or any combination thereof, that generates at least one cropping parameter for use by a particular reader, for example the image cropping reader 102. In some embodiments, the configuration system 112 includes at least one server, database, terminal, user device, and/or the like. Alternatively or additionally, in some embodiments, the configuration system 112 is embodied by a subsystem of the image cropping reader 102 itself. Alternatively or additionally, in some embodiments, the configuration system 112 is a subsystem of the image processing system 108 as described herein.

In some embodiments, the cropping parameter(s) stored via the image cropping reader 102 are determined and/or set via one or more external system(s). For example, in some embodiments, the image processing system 108 and/or another external system, such as the configuration system 112, generates cropping parameter(s) associated with one or more distance(s). In some embodiments, the configuration system 112 and/or the image processing system 108 is specially configured via software, hardware, firmware, and/or the like, for utilizing an image raytracing function and/or an image magnification estimation function to generate at least one cropping parameter, and/or at least one cropping parameter for each range represented by ranging data of a plurality of ranging data representing a plurality of ranges. In some embodiments, the image processing system 108, the configuration system 112, and/or another external system generates a crop-range parameter table comprising at least one cropping parameter associated with corresponding ranging data at which the at least one cropping parameter is to be used. The image cropping reader 102 may store the cropping parameter(s), and/or a data structure including cropping parameters such as a range-parameter table, via firmware during configuration of the image cropping reader 102. For example, in some embodiments, the configuration system 112 determines the at least one cropping parameter and/or range-crop dimension parameter and pushes or otherwise stores such data to the image cropping reader 102 for subsequent use. In some embodiments, the configuration system 112 utilizes one or more image raytracing function(s) to generate one or more cropping parameter(s) for a particular reader, and/or one or more image magnification estimation function(s) to generate the one or more cropping parameter(s) for a particular reader, that is then pushed to that reader (e.g., the image cropping reader 102) and/or one or more other reader(s) having the same configuration, imager arrangement, and/or the like that function similarly.

In some embodiments, the image cropping reader 102 communicates with an image processing system 108. In some embodiments, the image processing system 108 includes one or more computing device(s) embodied in hardware, software, firmware, and/or a combination thereof, that processes image data for a particular image processing task. In some embodiments, the image processing system 108 includes one or more application server(s) and/or database server(s) specially configured to execute one or more software application(s) that perform the image processing task. In some embodiments, the image processing system 108 includes one or more remote computing device(s). Alternatively or additionally, in some embodiments, the image processing system 108 includes one or more cloud computing device(s), which may be located remotely from one another and/or proximately to one another.

In some embodiments, the image processing system 108 is specially configured to perform an image processing algorithm on image data representing a cropped image. In some embodiments, the cropped image is received from the image cropping reader 102. In this regard, in some such embodiments the image cropping reader 102 generates a cropped image from a captured image, and transmits the cropped image to the image processing system 108 for processing. Alternatively or additionally, in some embodiments, the image cropping reader 102 processes the cropped image itself. In some embodiments, the image processing system 108 and/or the image cropping reader 102 initiate one or more process(es) upon completion of the image processing algorithm, for example based on the data decoded from a representation of the machine-readable symbology represented in the cropped image.

The optional communication network 110 in some embodiments is embodied in any of a myriad of network configurations. In some embodiments, the communications network 110 embodies a public network (e.g., the Internet). In some embodiments, the communications network 110 embodies a private network (e.g., an internal, localized, or closed-off network between particular devices). In some other embodiments, the communications network 110 embodies a hybrid network (e.g., a network enabling internal communications between particular connected devices and external communications with other devices). The communications network 110 in some embodiments includes one or more base station(s), relay(s), router(s), switch(es), cell tower(s), communications cable(s) and/or associated routing station(s), and/or the like. In some embodiments, the communications network 110 includes one or more user-controlled computing device(s) (e.g., a user owner router and/or modem) and/or one or more external utility devices (e.g., Internet service provider communication tower(s) and/or other device(s)).

The computing device(s) each may communicate over a whole or a portion of one or more communications networks, such as the communications network 110. For example, each of the components of the system communicatively coupled to transmit data to and/or receive data from, for example, one another over the same or different wireless or wired networks embodying the communications network 110. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, stand-alone entities communicating over the communications network 110, the various embodiments are not limited to this particular architecture. In other embodiments, one or more computing entities share one or more components, hardware, and/or the like, or otherwise are embodied by a single computing device such that connection(s) between the computing entities are over the communications network 110 are altered and/or rendered unnecessary. Alternatively or additionally still, in some embodiments the communications network 110 is embodied by one or more wireless and/or wired connection(s) between the image cropping reader 102 and/or image processing system 108.

FIG. 2A illustrates a block diagram of an example apparatus that may be specially configured in accordance with an example embodiment of the present disclosure. Specifically, FIG. 2A depicts an example improved image cropping reader apparatus ("apparatus 200") specifically configured in accordance with at least some example embodiments of the present disclosure. In some embodiments, the image cropping reader 102 and/or a portion thereof is embodied by one or more system(s), such as the apparatus 200 as depicted and described in FIG. 2A. Alternatively or additionally, in some embodiments, a single computing system embodies a combination of the image cropping reader 102 and/or the image processing system 108, for example embodied by the apparatus 200 as depicted and described in FIG. 2A. The apparatus 200 includes a processor 202, memory 204, input/ output circuitry 206, communications circuitry 208, imaging engine 210, ranging circuitry 212, image cropping circuitry 214, and/or optional image processing circuitry 216. In some embodiments, the apparatus 200 is configured, using one or more of the sets of circuitry 202, 204, 206, 208, 210, 212, 214, and/or 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform geometric image cropping as described herein, and/or processing of a cropped image for a particular image processing task. In some embodiments, the processor includes hardware, software, firmware, and/or a combination thereof, that activates capturing and/or receiving of a captured image captured via an imager. Additionally or alternatively, in some embodiments, the processor 202 includes hardware, software, firmware, and/or a combination thereof, that identifies at least one cropping parameter, for example from a memory of the apparatus 200. Additionally or alternatively, in some embodiments, the processor 202 includes hardware, software, firmware, and/or a combination thereof, that crops the captured image based at least in part on the at least one cropping parameter to generate a cropped image. Additionally or alternatively, in some embodiments, the processor 202 includes hardware, software, firmware, and/or a combination thereof, that applies the cropped image to an image processing algorithm. Additionally or alternatively, in some embodiments, the processor 202 includes hardware, software, firmware, and/or a combination thereof, that transmits the cropped image to an external device for further processing.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the apparatus 200.

The apparatus 200 includes an imaging engine 210. In some embodiments, the imaging engine 210 includes hardware, software, firmware, and/or a combination thereof, that supports various functionality associated with image capture of a field of view via one or more imager(s). For example, in some embodiments, the imaging engine 210 includes at least one imager, each comprising at least one lens and at least one image sensor. Each imager of the imaging engine 210 in some embodiments is activatable to capture image data representing a different field of view. Additionally or alternatively, in some embodiments, the imaging engine 210 includes one or more illuminator(s) activatable to illuminate a particular field of view by projecting a particular illumination. Additionally or alternatively, in some embodiments, the imaging engine includes one or more trigger(s) and/or other input component(s) that activate capture via one or more particular imager(s) and/or illumination via one or more particular illuminator(s). In some embodiments, the imaging engine 210 includes a separate processor, specially configured field programmable gate array (FPGA), or a specially programmed application specific integrated circuit (ASIC).

The ranging circuitry 212 includes hardware, software, firmware, and/or a combination thereof, that supports various functionality associated with generating and/or otherwise determining ranging data. For example, in some embodiments, the ranging circuitry 212 includes hardware, software, firmware, and/or any combination thereof, embodying a rangefinder that generates real-time ranging data representing a distance from the rangefinder to a particular location indicated via the rangefinder. In some such embodiments, the ranging data approximates or is utilized to derive ranging data representing a distance from an image sensor to a particular location. The particular location may be a point at which a laser projected via a laser aimer of the apparatus 200 reaches a target object in an environment (e.g., an object with which the apparatus 200 is aligned for purposes of reading a machine-readable symbology on the target object). Alternatively or additionally, in some embodiments, the ranging circuitry 212 includes hardware, software, firmware, and/or a combination thereof, that activates the rangefinder to generate corresponding ranging data associated therewith. In some embodiments, the ranging circuitry 212 includes a separate processor, specially configured field programmable gate array (FPGA), or a specially programmed application specific integrated circuit (ASIC).

In some embodiments, the apparatus 200 further includes image cropping circuitry 214. The image cropping circuitry 214 includes hardware, software, firmware, and/or a combination thereof, that supports various functionality associated with cropping captured image data. For example, in some embodiments, the image cropping circuitry 214 includes hardware, software, firmware, and/or a combination thereof, that retrieves, determines, and/or otherwise identifies at least one cropping parameter for use in cropping a captured image. In some such embodiments the image cropping circuitry 214 includes hardware, software, firmware, and/or a combination thereof, that identifies the at least one cropping parameter based at least in part on ranging data, for example determined via the ranging circuitry 212. Additionally or alternatively, in some embodiments, the image cropping circuitry 214 includes hardware, software, firmware, and/or a combination thereof, that retrieves at least one cropping parameter from a range-parameter table maintained by the apparatus 200, for example stored via the memory 204. Additionally or alternatively, in some embodiments, the image cropping circuitry 214 includes hardware, software, firmware, and/or a combination thereof, that performs the cropping of a captured image to generate a cropped image therefrom, such cropping utilizing the determined at least one cropping parameter to identify portion(s) of the captured image that should be cropped out as not likely to include relevant data for performing an image processing algorithm. In some embodiments, the image cropping circuitry 214 includes a separate processor, specially configured field programmable gate array (FPGA), or a specially programmed application specific integrated circuit (ASIC).

In some embodiments, the apparatus 200 optionally includes image processing circuitry 216. The image processing circuitry 216 includes hardware, software, firmware, and/or a combination thereof, that supports various functionality associated with processing a cropped image for a particular image processing task (e.g., reading one or more machine-readable symbologies depicted therein). For example, in some embodiments, the image processing circuitry 216 includes hardware, software, firmware, and/or a combination thereof, that performs image deconvolution of a cropped image via an image deconvolution algorithm. The image deconvolution algorithm in some embodiments outputs a processed image. Additionally or alternatively, in some embodiments, the image processing circuitry 216 includes hardware, software, firmware, and/or a combination thereof, that performs image processing of deconvoluted image data. In some embodiments, the image processing circuitry 216 applies a processed image to an image processing algorithm that outputs particular data associated with a particular image processing task. In some embodiments, the image processing circuitry 216 includes hardware, software, firmware, and/or a combination thereof, that processes image data of the processed image to attempt to detect at least one machine-readable symbology represented in the processed image data, and/or decode at least one machine-readable symbology detected as represented in the processed image data. In some embodiments, the image processing circuitry 216 includes a separate processor, specially configured field programmable gate array (FPGA), or a specially programmed application specific integrated circuit (ASIC).

Additionally or alternatively, in some embodiments, two or more of the sets of circuitries 202-216 are combinable. Alternatively or additionally, in some embodiments, one or more of the sets of circuitry perform some or all of the functionality described associated with another component. For example, in some embodiments, two or more of the sets of circuitry 202-216 are combined into a single module embodied in hardware, software, firmware, and/or a combination thereof. Similarly, in some embodiments, one or more of the sets of circuitry, for example the imaging engine 210, ranging circuitry 212, image cropping circuitry 214, and/or image processing circuitry 216, and/or any combination thereof, is/are combined with the processor 202, such that the processor 202 performs one or more of the operations described above with respect to each of these sets of circuitry 210-216.

It should be appreciated that upon configuration of the apparatus 200 as depicted and described herein, the apparatus 200 may be utilized for efficient image capture, cropping, and subsequent processing. For example, in some embodiments the apparatus 200 is caused to capture or otherwise receive a captured image via an imager. The apparatus 200 is further caused to identify at least one stored cropping parameter associated with the imager. The apparatus 200 is further caused to crop the captured image based at least in part on the at least one stored cropping parameter, for example to generate a cropped image from the captured image. Subsequently, the apparatus 200 is further caused to apply the cropped image to at least one further image processing algorithm, for example to an image deconvolution algorithm and/or machine-readable symbology detection and/or decoding algorithm, or directly to a machine-readable symbology detection and/or decoding algorithm. In this regard, the apparatus 200 in some such embodiments represents a symbology reader specially configured by the stored cropping parameter(s), for example generated utilizing the methodologies described herein, to perform such operations more efficiently.

FIG. 2B illustrates a block diagram of another example apparatus that may be specially configured in accordance with an example embodiment of the present disclosure. Specifically, FIG. 2B depicts an example cropping parameter configuration apparatus ("apparatus 250") specifically configured in accordance with at least some example embodiments of the present disclosure. The cropping parameter configuration apparatus may perform any of the process(es) that generate cropping parameter(s) for a particular reader, for example embodied by the apparatus 200, as described herein. In some embodiments, the configuration system 112 and/or a portion thereof is embodied by one or more system(s), such as the apparatus 250 as depicted and described in FIG. 2B. Alternatively or additionally, in some embodiments, a single computing system embodies a combination of the image cropping reader 102, the image processing system 108, and/or the configuration system 112, for example embodied by the apparatus 250 as depicted and described in FIG. 2B alone and/or in combination with the apparatus 200 as depicted and described in FIG. 2A. The apparatus 250 includes a processor 252, memory 254, input/output circuitry 256, communications circuitry 258, input identification circuitry 260, range identification circuitry 262, parameter generation circuitry 264, and parameter maintenance circuitry 266. In some embodiments, the apparatus 250 is configured, using one or more of the sets of circuitry 252, 254, 256, 258, 260, 262, 264, and/or 266, to execute and perform the operations described herein.

It will be appreciated that the apparatus 250 includes certain components similarly named to components of the apparatus 200. Such components perform the same and/or similar functionality with respect to the apparatus 250. For purposes of brevity and clarity, additional disclosure with respect to the components having the same name to those depicted and described with respect to apparatus 200 is omitted herein.

In some embodiments, the apparatus 250 includes input identification circuitry 260. The input identification circuitry 260 includes hardware, software, firmware, and/or a combination thereof, that retrieves, receives, and/or otherwise identifies any data utilized as an input to one or more function(s) for generating cropping parameter(s), as described herein. For example, in some embodiments, the input identification circuitry 260 includes hardware, software, firmware, and/or a combination thereof, that retrieves, receives, and/or otherwise identifies lens data associated with a particular imager, reader, and/or other device to be configured. Additionally or alternatively, in some embodiments, the input identification circuitry 260 includes hardware, software, firmware, and/or a combination thereof, that retrieves, receives, and/or otherwise identifies code size data associated with a particular imager, reader, and/or other device to be configured. Additionally or alternatively, in some embodiments, the input identification circuitry 260 includes hardware, software, firmware, and/or a combination thereof, that receives, retrieves, and/or otherwise identifies data that indicates or uniquely identifies a particular reader, apparatus, device, imager, and/or the like, where such data is usable to retrieve stored data associated with the particular reader, apparatus, device, imager, and/or the like. Additionally or alternatively, in some embodiments, the input identification circuitry 260 includes hardware, software, firmware, and/or a combination thereof, that embodies and/or maintains one or more datastore(s) including any such data for one or more particular reader(s), apparatus(es), and/or the like. In some embodiments, the input identification circuitry 260 includes a separate processor, specially configured field programmable gate array (FPGA), or a specially programmed application specific integrated circuit (ASIC).

In some embodiments, the apparatus 250 includes range identification circuitry 262. The range identification circuitry 262 includes hardware, software, firmware, and/or a combination thereof, that identifies ranging data utilized for a particular function for generating at least one cropping parameter. For example, in some embodiments, the range identification circuitry 262 includes a rangefinder that generates and/or detects ranging data. Additionally or alternatively, in some embodiments, the range identification circuitry 262 includes hardware, software, firmware, and/or a combination thereof, that retrieves, receives, and/or otherwise identifies ranging data from a datastore. Additionally or alternatively, in some embodiments, the range identification circuitry 262 includes hardware, software, firmware, and/or a combination thereof, that generates ranging data based at least in part on a particular algorithm. In some embodiments, the range identification circuitry 262 includes a separate processor, specially configured field programmable gate array (FPGA), or a specially programmed application specific integrated circuit (ASIC).

In some embodiments, the apparatus 250 includes parameter generation circuitry 264. The parameter generation circuitry 264 includes hardware, software, firmware, and/or a combination thereof, that generates at least one cropping parameter. For example, in some embodiments, the parameter generation circuitry 264 includes hardware, software, firmware, and/or a combination thereof, that generates at least one cropping parameter utilizing one or more function(s) described herein. Additionally or alternatively, in some embodiments, the parameter generation circuitry 264 includes hardware, software, firmware, and/or a combination thereof, that associates generated cropping parameter(s) with a particular range represented by particular ranging data. Additionally or alternatively, in some embodiments, the parameter generation circuitry 264 includes hardware, software, firmware, and/or a combination thereof, that applies input data to one or more image raytracing function(s). Additionally or alternatively still, in some embodiments, the parameter generation circuitry 264 includes hardware, software, firmware, and/or a combination thereof, that applies input data to one or more image magnification estimation function(s). Additionally or alternatively, in some embodiments, the parameter generation circuitry 264 includes hardware, software, firmware, and/or a combination thereof, that generates at least one cropping parameter based at least in part on an image area corresponding to a particular image sensor. In some embodiments, the parameter generation circuitry 264 includes a separate processor, specially configured field programmable gate array (FPGA), or a specially programmed application specific integrated circuit (ASIC).

In some embodiments, the apparatus 250 includes parameter maintenance circuitry 266. The parameter maintenance circuitry 266 includes hardware, software, firmware, and/or a combination thereof, that maintains at least one cropping parameter for use in storing to and/or configuring a particular device, for example a specially configured image cropping reader. For example, in some embodiments, the parameter maintenance circuitry 266 includes hardware, software, firmware, and/or a combination thereof, that is configured to store at least one cropping parameter to a particular reader, for example via a portion of software and/or firmware, for subsequent use. Additionally or alternatively, in some embodiments, the parameter maintenance circuitry 266 includes hardware, software, firmware, and/or a combination thereof, that transmits at least one cropping parameter to a reader for storage and/or use. Additionally or alternatively, in some embodiments, the parameter maintenance circuitry 266 includes hardware, software, firmware, and/or a combination thereof, that maintains at least one range-parameter table for storing to at least one reader, such at least one range-parameter table including one or more cropping parameter and corresponding ranging data for any of a plurality of ranges. Additionally or alternatively, in some embodiments, the parameter maintenance circuitry 266 includes hardware, software, firmware, and/or a combination thereof, that includes at least one cropping parameter (e.g., as a standalone portion of data and/or in a range-parameter table) associated with different imager(s), for example based at least in part on lens data for the different imagers, image sensor parameter data for the different imagers, and/or the like. In some embodiments, the parameter maintenance circuitry 266 includes a separate processor, specially configured field programmable gate array (FPGA), or a specially programmed application specific integrated circuit (ASIC).

Additionally or alternatively, in some embodiments, two or more of the sets of circuitries 252-266 are combinable. Alternatively or additionally, in some embodiments, one or more of the sets of circuitry perform some or all of the functionality described associated with another component. For example, in some embodiments, two or more of the sets of circuitry 252-266 are combined into a single module embodied in hardware, software, firmware, and/or a combination thereof. Similarly, in some embodiments, one or more of the sets of circuitry, for example the input identification circuitry 260, range identification circuitry 262, parameter generation circuitry 264, parameter maintenance circuitry 266, and/or any combination thereof, is/are combined with the processor 252, such that the processor 252 performs one or more of the operations described above with respect to each of these sets of circuitry 260-266.

Example Cropping Parameter Generation and Use of the Disclosure

Having described example systems and apparatuses in accordance with the present disclosure, example generation and/or use of cropping parameter(s) will now be disclosed. In some embodiments, cropping parameter generation is performed utilizing the image cropping reader 102, for example embodied by the apparatus 200. Additionally or alternatively, in some embodiments, the cropping parameter generation is performed based at least in part by a corresponding external system, for example a configuration system, such as the configuration system 112, and/or an image processing system, such as the image processing system 108. The external system may perform the cropping parameter generation based at least in part on image(s) captured via the imaging engine of the apparatus 200, for example. In some embodiments, a specially configured reader—for example the image cropping reader 102 embodied by the apparatus 200—is configured based at least in part on one or more cropping parameter(s) generated as described herein. For example, in some embodiments, an external system configures the image cropping reader 102 embodied by the apparatus 200 based at least in part on particular cropping parameter(s) generated based at least in part on the specific component(s) if the imagers within the apparatus 200, as described herein. In this regard, it will be appreciated that an external system may perform one or more process(es) for generating cropping parameter(s) for particular configuration of imager(s), and may configure the apparatus 200 to utilize such cropping parameter(s) corresponding to the particular design elements of the imager(s) in the apparatus 200, such as by transmitting and/or otherwise storing the cropping parameter(s) for access via the apparatus 200.

FIG. 3 illustrates a visualization of an example imager arrangement with raytracing in accordance with at least one example embodiment of the present disclosure. Specifically, FIG. 3 illustrates an example imager 300 in a particular arrangement, with visualization of raytracing from the components of the imager 300 to a machine-readable symbology 302 within a field of view captured by the imager 300. The raytracing as depicted and described may be utilized to generate at least one cropping parameter associated with the particular imager arranged as depicted. In this regard, it will be appreciated that the imager arrangement depicted embodies a particular example imager, and that in other embodiments other imagers may be arranged differently. Similarly, in this regard, the at least one cropping parameter generated may be associated specifically with the imager arrangement as depicted, such that different cropping parameter(s) may be generated associated with other imager arrangement(s).

In some embodiments, the apparatus 250 generates and/or maintains a simulation that performs the cropping parameter generation as depicted and described with respect to FIG. 3. For example, in some embodiments, the apparatus 250 performs a particular simulation that generates the cropping parameter(s) for a particular imager arrangement, such as the imager arrangement depicted in FIG. 3. The simulation may embody or otherwise perform an image raytracing function in some embodiments that is utilized to generate the cropping parameter(s). Alternatively or additionally, in some embodiments, the simulation may embody or otherwise perform an image magnification estimation function utilized to generate the cropping parameter(s). In this regard, the apparatus 250 in some embodiments maintains a software environment that embodies the simulation of a particular imager arrangement, uses the simulation to generate the cropping parameter(s), and subsequently pushes such cropping parameter(s) for storage by one or more reader(s) operating utilizing the particular imager configuration. In this regard, it will be appreciated that the imager as depicted and described may be a visualization of the simulation environment, for example that matches particular lens data of a real imager to be configured. In some embodiments, the apparatus 250 maintains a simulation utilizing particular raytracing and/or visualization software, for example and without limitation Zemax, Code V, and/or the like, to perform raytracing and/or image magnification estimation.

The imager 300 depicted in FIG. 3 includes an image sensor 306 and a lens 304. In some embodiments, the image sensor 306 includes circuitry that captures attenuation of light on a particular sensor to generate a corresponding image representation of light attenuation on a particular sensor. Non-limiting examples of an image sensor include a CMOS sensor and/or a CCD sensor. In this regard, the image sensor 306 may be configured to generate image data representing light incident at each particular point of the image sensor 306. The image sensor may be configured in accordance with a particular resolution, for example corresponding to a particular number of pixels captured via the image sensor 306. In this regard, the image sensor 306 may output a captured image of the particular resolution corresponding to the image sensor 306.

Additionally, in some embodiments, the imager 300 depicted in FIG. 3 further includes a lens 304. The lens 304 includes one or more optical component(s) through which light is projected. In some embodiments, the lens 304 is specially configured to project, reflect, refract, and/or otherwise manipulate light to define a field of view capturable by the corresponding image sensor 306. In some embodiments, the lens 304 is designed to affect light in a particular manner. In some embodiment the lens is designed based at least in part on particular values for one or more optical factors, for example represented by corresponding lens data.

In some embodiments, the lens 304 is a fixed lens-such that its position in relation to the image sensor 306 remains static. In this regard, the focal length associated with the depicted imager arrangement may be fixed. In other embodiments, the lens 304 embodies a variable focus lens. For example, the position of the lens 304 in relation to the image sensor 306 may be variable, thus enabling the focal length of the imager arrangement to change as the lens 304 is repositioned. In this regard, in some embodiments the lens data associated with the imager arrangement includes data indicating the current focal length and/or current position of the lens 304. In some embodiments, the lens data for the current configuration of the imager arrangement is determinable from one or more component(s) of the imager arrangement and/or an associated component (e.g., a processor of the apparatus 200 that controls the imager).

As depicted, the imager arrangement including the lens 304 and the image sensor 306 captures a field of view including the machine-readable symbology 302. In one example context, the machine-readable symbology may embody a barcode facing the imager including the lens 304 and image sensor 306. As depicted, the machine-readable symbology 302 is defined by particular dimensions, for example a particular height dimension defined by the height 314. In some embodiments, the machine-readable symbology 302 similarly includes a particular width dimension, which may be the same or different from the value of the height 314. In some embodiments, the height 314 is predetermined (e.g., representing a particular code size) or determinable, for example by a configuration system and/or the apparatus 200.

In some embodiments, a laser aimer associated with the imager 300 is projected towards the machine-readable symbology 302. In a circumstance where the aimer pattern produced by the laser aimer is positioned on the machine-readable symbology 302, the corresponding image area representing the area of the image sensor 306 that depicts a portion of the machine-readable symbology 302 is determinable in any of a myriad of manners. In some embodiments, the at least one cropping parameter is based at least in part on an aimer position for said aimer, for example determined when the aimer position is within the boundary of the machine-readable symbology. In some embodiments, the aimer position is simulated as oriented to be at the border of the simulated machine-readable symbology, for example.

In some embodiments, the image area corresponding to the machine-readable symbology 302 is determinable utilizing raytracing as described herein. FIG. 3 depicts the various ray traces of light from the top and bottom edges of the machine-readable symbology 302 to the image sensor 306. Raytracing may be performed utilizing any of a myriad of image raytracing function(s), including one or more custom image raytracing functions and/or known image raytracing functions (e.g., Zemax, Code V, and/or the like). As depicted, the ray traces may define an image area within which light from the machine-readable symbology impacts the image sensor 306, and thereby is represented via corresponding image data for the image area. Specifically, as illustrated, the ray traces from the machine-readable symbology 302 to the image sensor 306 define the image area 316. Further as illustrated, the image area 316 is defined based at least in part on linear image magnification corresponding to the linear raytracing from the edges of the machine-readable symbology 302 to corresponding points of impact at the sensor 306. It will be appreciated that the image area 316 may be associated with a particular height and a particular width corresponding to the edge boundaries of the image area 316 based on the ray traces from the machine-readable symbology 302 for the particular arrangement and configuration of the imager 300. In some embodiments, the raytracing is performed based on particular known size data corresponding to machine-readable symbologies, for example based at least in part on the largest machine-readable symbology that is specified as capturable via the imager 300 during operation in particular warranted circumstances.

In some embodiments, the imager 300 includes or is associated with a rangefinder that determines and/or generates ranging data representing a particular distance to the machine-readable symbology 302. For example, in some embodiments, the laser aimer embodies a rangefinder that generates the ranging data. In this regard, the image area 316 determined for the machine-readable symbology 302 may similarly be associated with the particular ranging data at which such a determination is performed. In this regard, it will be appreciated that at different distances corresponding to different ranging data, the image area 316 may differ. In this regard, the particular depicted image area 316 corresponds to a particular corresponding imager arrangement and configuration, code size data corresponding to the height 314, and distance from the image sensor 306 to the machine-readable symbology 302. As illustrated, the rangefinder may determine and/or generate ranging data representing a distance 308. The distance 308 may include a first distance 312 between the lens 304 and the machine-readable symbology 302, and a second distance 310 between the image sensor 306 and the lens 304. In some embodiments, the lens 304 embodies a variable focus lens where the position of the lens 304 is alterable. As the position of the lens is alter, the second distance 310 and the first distance 312 are similarly altered, and the current focus associated with the imager 300 is altered based on the new distances.

In some embodiments, at least one cropping parameter is determinable based at least in part on the image area 316. In some embodiments, the image area 316 is determinable based on the parameters of distance to the machine-readable symbology and the image magnification of the imager 300. In some embodiments, the distance is determined from the first and/or second distances as depicted and described, and/or derivable in the simulation from focal length of the imager 300. Similarly, in some embodiments, the image magnification is determined from lens data utilized to configure the simulation for the particular imager 300 to include the particular lens 304. For example, in some embodiments, the at least one cropping parameter includes a percentage multiplier that indicates the percentage of the total resolution of the image sensor 306 that corresponds to the image area 316. In a circumstance where the image area 316 corresponds to 20% of the total resolution for the image sensor 306, for example, a cropping parameter of 0.2 may be determined corresponding to ranging data representing the distance 308. Alternatively or additionally, in some embodiments, the at least one cropping parameter represents any other data utilized to determine the dimensions of the image area 316 that represent the machine-readable symbology 302 at the particular distance 308. In some embodiments, the at least one cropping parameter includes a cropping parameter associated with each dimension of the image area 316. For example, the at least one cropping parameter in some embodiments includes a first cropping parameter associated with a height of the image area 316 and a second cropping parameter associated with a width of the image area 316. In some embodiments, such plurality of cropping parameters may be the same value (e.g., each set to 0.2). Alternatively or additionally, in some embodiments, such a plurality of cropping parameters may represent different values (e.g., a height cropping parameter of 0.2 and a width cropping parameter of 0.5 in a circumstance where the machine-readable symbology 302 is represented by a greater width than height in the image area 316.

In some embodiments, the image area 316 is determined via an image magnification estimation function. For example, in some embodiments code size data corresponding to the machine-readable symbology 302 is determined and/or retrieved by a reader, for example an apparatus 200 including the imager 300, for use in generating the corresponding image area 316. In some embodiments, the code size data represents the dimensions of the largest machine-readable symbology processable by the apparatus, for example embodying the height 314 and a corresponding width of the machine-readable symbology 302. In some such embodiments, the largest code size is utilized to ensure that the resulting cropping parameter(s) are sufficiently large enough to ensure all sizes of machine-readable symbology capable of being read via the apparatus are represented in the portion of the image that remains after cropping. In this regard, the data outputted via the image magnification estimation function may correspond to a particular estimated area of the image sensor 306 corresponding to a captured representation of the machine-readable symbology 302, for example embodying an estimation of the image area 316.

In one example context, a 100 mil C39 barcode at 2 m distance is associated with an image area that results in less than 20% of the complete sensor area for the image sensor 306. In this regard, utilizing any of the disclosed methodologies for determining this image area, corresponding at least one cropping parameter may be generated that corresponds to cropping all but that 20% of a captured image. It will be appreciated that at other distances, this value may change. For example, as the imager 300 is closer to the machine-readable symbology 302 (e.g., a distance of 1 meter), the image area required to represent the machine-readable symbology may increase, for example to 50% of the complete sensor area. Similarly, as the imager is further from the machine-readable symbology 302 (e.g., at a distance of 5 meters), the image area required to represent the machine-readable symbology may decrease, for example to less than 10%. In this regard, corresponding cropping parameter(s) may be generated that correspond to such image areas, for example generated utilizing any of the function(s) described herein, and stored associated with particular data representing the ranges corresponding to such at least one cropping parameter (e.g., ranging data). In some embodiments, the function(s) rely on an aimer (e.g., representing a near co-axial center with respect to a capturable field of view) to be within the boundary of the machine-readable symbology 302 to ensure that the cropped image based on the at least one determined cropping parameter always includes enough data to depict the entirety of the representation of machine-readable symbology.

FIG. 4 illustrates an example range-parameter table in accordance with at least one example embodiment of the present disclosure. Specifically, FIG. 4 illustrates a specific range-parameter table 400. As described herein, the range-parameter table 400 may be generated utilizing any of the mechanism(s) described herein, for example utilizing image raytracing function(s) and/or image magnification estimation function. In some embodiments, the apparatus 250 generates the range-parameter table 400 during a configuration process for use in configuring one or more device(s), reader(s), and/or the like to utilize the range-parameter table 400. For example in some embodiments the apparatus 250 configures an apparatus 200 to utilize the range-parameter table 400.

As illustrated, the range-parameter table 400 includes at least one cropping parameter associated with ranging data representing a particular range of a plurality of different ranges. For example, the range-parameter table 400 includes a first record 402A associating a first cropping parameter with first ranging data representing a distance of 0.1 meters from a target object, a second record 402B associating a second cropping parameter with second ranging data representing a distance of 0.3 meters from a target object, a third record 402C associating a third cropping parameter with third ranging data representing a distance of 0.7 meters from a target object, a fourth record 402D associating a fourth cropping parameter with fourth ranging data representing a distance of 1.0 meters from a target object, a fifth record 402E associating a fifth cropping parameter with fifth ranging data representing a distance of 2.0 meters from a target object, a sixth record 402F associating a sixth cropping parameter with sixth ranging data representing a distance of 6.0 meters from a target object, and a seventh record 402G associating a seventh cropping parameter with seventh ranging data representing a distance of 10.0 meters from a target object. In some embodiments, each cropping parameter is generated utilizing a particular function, for example image raytracing function(s) and/or image magnification estimation function(s), where the corresponding ranging data is detected and/or generated during the executed function. For example, in some embodiments, ranging data is detected using a rangefinder in conjunction with generating the corresponding cropping parameter for the range represented by the ranging data. In this regard, the function utilized to generate the at least one cropping parameter generates particular value(s) for that particular range.

In some embodiments, the range-parameter table 400 is determined before use in a particular device, for example before use by a particular reader. In this regard, the generated range-parameter table 400 may be installed, uploaded to, pushed, and/or otherwise stored to the particular device for subsequent usage. For example, in some embodiments, the range-parameter table 400 is stored to the apparatus 200 during configuration and/or production, for example as software and/or firmware, for use during operation of the apparatus 200.

FIG. 5 illustrates an example data flow to generate cropping parameter(s) in accordance with at least one example embodiment of the present disclosure. Specifically, FIG. 5 depicts a data flow for generating at least one cropping parameter utilizing image raytracing function(s). In this regard, the generated at least one cropping parameter may represent the area of a particular image sensor that may be cropped at a particular range based on the particular area of the image sensor that is determined via raytracing to corresponding to a machine-readable symbology. The data flow may be performed by the apparatus 200 and/or a corresponding configuration system, for example the apparatus 250 during generation of a range-parameter table for storing to the apparatus 200, another reader, and/or the like. In some embodiments, the data flow is performed within a simulation environment maintained via the apparatus 250 to generate particular cropping parameter(s) to be pushed to a particular reader, for example embodied by the apparatus 200.

As illustrated the data flow includes ranging data 502. The ranging data 502 represents a particular range to a target object from a particular component of a device, for example a rangefinder, an image sensor, and/or the like. In some embodiments, the ranging data 502 is determined via a rangefinder of an apparatus, for example the apparatus 200. The ranging data 502 may correspond to a data value of any determinable unit, for example meters, inches, feet, millimeters, and/or the like. In some embodiments, the apparatus 250 simulates various values for ranging data 502 to generate cropping parameter(s) corresponding to each of such distances represented by the different ranging data.

As illustrated the data flow includes lens data 504. In some embodiments, the lens data 504 represents particular data value(s) for one or more optical properties associated with a lens of a device. For example, the lens data 504 may represent the refractive index, focal length, and/or other optical properties associated with the lens of a particular reader, for example embodied by the apparatus 200. The lens data 504 in some embodiments corresponds to a lens of a particular reader utilized during configuration of a range-parameter table for storage and/or use by other reader(s) having a lens with the same optical properties, or optical properties determined to be similar. In some embodiments, the lens data 504 is user-inputted or otherwise determinable by the apparatus 250 for use in configuring a corresponding reader including an imager consistent with such lens data 504.

As illustrated, the ranging data 502 and the lens data 504 is inputted into an image raytracing function(s) 506. In some embodiments, the image raytracing function(s) 506 generates and/or otherwise models ray traces from a position on a machine-readable symbology in an environment to a corresponding position on an image sensor. In this regard, the ray traces may be utilized to determine an image area that represents the portion of the image sensor that represents at least a portion of the machine-readable symbology in the current configuration of the device. For example, the ray traces may be based on the range from the machine-readable symbology as represented by the ranging data 502, the design and/or configuration of the lens and/or imager represented at least in part by the lens data 504, and/or the like.

In some embodiments, the image raytracing function(s) 506 are utilized to generate an image area 508. The image area 508 includes data representing the area, dimensions, and/or portion of an image sensor that corresponds to a representation of a machine-readable symbology based on the raytracing performed via the image raytracing function(s) 506. It will be appreciated that in some contexts, as the device (e.g., a reader) is moved further from the machine-readable symbology as represented by the ranging data 502, the image area 508 may decrease as the machine-readable symbology is represented utilizing a smaller portion of the total image area for the image sensor. Additionally or alternatively, the image area 508 may differ based on the configuration of the lens represented by the lens data 504. In this regard, the image raytracing function(s) 506 may generate a different image area 508 as either or both of the ranging data 502 and/or lens data 504 change.

In some embodiments, the image area 508 is utilized to generate cropping parameter(s) 510. In some embodiments, the cropping parameter(s) 510 correspond to a portion of a total image area for an image sensor that is to be cropped to leave the image area 508 remaining. For example, in some embodiments, the cropping parameter(s) 510 includes a value representing a multiplier to be applied to each dimension of the total image area to leave the image area 508 remaining. In one example context, the cropping parameter(s) 510 includes a percentage value of 20%, for example where the 20% represents a multiplier of 0.2 to be applied to each dimension of the total image area. Alternatively or additionally, in some embodiments, the cropping parameter(s) 510 includes a plurality of values including a value representing a multiplier for each dimension of the total image area.

In some embodiments, the cropping parameter 510 is stored to a particular device, for example the apparatus 200, for use in cropping one or more subsequently captured image(s). Additionally or alternatively, in some embodiments, the cropping parameter(s) 510 is/are stored associated with a particular range. For example, in some embodiments, the cropping parameter(s) 510 is/are stored associated with the ranging data 502. In this regard, the cropping parameter(s) 510 may be retrievable for use in a circumstance where a range of a device to a machine-readable symbology is determined to be equivalent or associated with the ranging data 502. Additionally or alternatively, in this regard, it will be appreciated that different cropping parameter(s) 510 may be determined and/or associated with different ranging data, for example in a range-parameter table as described herein.

FIG. 6 illustrates an example data flow to generate cropping parameter(s) in accordance with at least one example embodiment of the present disclosure. Specifically, FIG. 6 depicts a data flow for generating at least one cropping parameter utilizing image magnification estimation function(s). In this regard, the generated at least one cropping parameter may represent the area of a particular image sensor that may be cropped at a particular range based on the particular area of the image sensor that is determined via estimated magnification of a particular machine-readable symbology. The data flow may be performed by the apparatus 200 and/or a corresponding configuration system, for example the apparatus 250 during generation of a range-parameter table for storing to the apparatus 200, another reader, and/or the like. In some embodiments, the data flow is performed within a simulation environment maintained via the apparatus 250 to generate particular cropping parameter(s) to be pushed to a particular reader, for example embodied by the apparatus 200.

As illustrated the data flow includes ranging data 602. The ranging data 602 represents a particular range to a target object from a particular component of a device, for example a rangefinder, an image sensor, and/or the like. In some embodiments, the ranging data 602 is determined via a rangefinder of an apparatus, for example the apparatus 200. The ranging data 602 may correspond to a data value of any determinable unit, for example meters, inches, feet, millimeters, and/or the like.

As illustrated the data flow includes optional lens data 604. In some embodiments, the lens data 604 represents particular data value(s) for one or more optical properties associated with a lens of a device. For example, the lens data 604 may represent the refractive index, focal length, and/or other optical properties associated with the lens of a particular reader, for example embodied by the apparatus 200. The lens data 604 in some embodiments corresponds to a lens of a particular reader utilized during configuration of a range-parameter table for storage and/or use by other reader(s) having a lens with the same optical properties, or optical properties determined to be similar.

As illustrated, the data flow includes code size data 606. In some embodiments, the code size data 606 represents particular data value(s) embodying dimension(s) of at least one machine-readable symbology readable by a particular device (e.g., a reader embodied by the apparatus 200). In some embodiments, the code size data 606 corresponds to a largest code size readable via the reader. For example, such code size data 606 may be determinable and/or otherwise pre-defined, such as based on a particular configuration specification or other design element(s) associated with a device capable of reading such machine-readable symbologies.

As illustrated, the ranging data 602, optionally lens data 604, and/or the code size data 606 are inputted into image magnification estimation function(s) 608. In some embodiments, the image magnification estimation function(s) 608 estimates the manipulation of the size of the machine-readable symbology represented by the code size data 606 by the lens of a particular device at a particular range, for example corresponding to the ranging data 602. In this regard, the estimated magnification may be utilized to determine an image area that represents the portion of the image sensor that represents at least a portion of the machine-readable symbology in the current configuration of the device. For example, the magnification estimated by the image magnification estimation function(s) 608 may indicate the reduction in size of the machine-readable symbology as represented via an image sensor that captures a representation of the machine-readable symbology due to the one or more optical elements embodying at least one lens of said device (e.g., a reader).

In some embodiments, the image magnification estimation function(s) 608 is/are utilized to generate an image area 610. The image area 608 includes data representing the area, dimensions, and/or portion of an image sensor that corresponds to a representation of a machine-readable symbology based on the magnification estimation performed by the image magnification estimation function(s) 608. It will be appreciated that in some contexts, as the device (e.g., a reader) is moved further from the machine-readable symbology as represented by the ranging data 602, the image area 610 may decrease as the machine-readable symbology is represented utilizing a smaller portion of the total image area for the image sensor. Additionally or alternatively, the image area 610 may differ based on the configuration of the lens represented by the lens data 604. Additionally or alternatively still, the image area 610 may differ based on the dimensions of the machine-readable symbology as represented by the code size data 606, for example where larger machine-readable symbologies are associated with larger image areas after magnification. In this regard, the image magnification estimation function(s) 608 may generate a different image area 610 as any one or combination of the range data 602, optional lens data 604, and/or code size data 606 changes.

In some embodiments, the image area 610 is utilized to generate cropping parameter(s) 612. In some embodiments, the cropping parameter(s) 612 correspond to a portion of a total image area for an image sensor that is to be cropped to leave the image area 610 remaining. For example, in some embodiments, the cropping parameter(s) 612 includes a value representing a multiplier to be applied to each dimension of the total image area to leave the image area 610 remaining. In one example context, the cropping parameter(s) 610 includes a percentage value of 20%, for example where the 20% represents a multiplier of 0.2 to be applied to each dimension of the total image area. Alternatively or additionally, in some embodiments, the cropping parameter(s) 612 includes a plurality of values including a value representing a multiplier for each dimension of the total image area.

In some embodiments, the cropping parameter(s) 612 is/are stored associated with a particular range. For example, in some embodiments, the cropping parameter(s) 612 is/are stored associated with the ranging data 602. In this regard, the cropping parameter(s) 612 may be retrievable for use in a circumstance where a range of a device to a machine-readable symbology is determined to be equivalent or associated with the ranging data 602. Additionally or alternatively, in this regard, it will be appreciated that different cropping parameter(s) 612 may be determined and/or associated with different ranging data, for example in a range-parameter table as described herein.

Regardless of the methodology utilized to identify at least one cropping parameter, in some embodiments the cropping parameter is utilized to crop a captured image. For example, in some embodiments, the apparatus 200 is configured to utilize the at least one cropping parameter to crop an image captured at one or more range(s). For example, the apparatus 200 may output only a portion of the image data captured by the image sensor for further processing by cropping the captured image to the image area corresponding to the at least one cropping parameter. In this regard, the reduced-size image is more efficiently transmissible and/or processable via one or more image processing algorithm(s).

Example Processes of the Disclosure

Having described example systems and apparatuses, data architectures, and data flows in accordance with the disclosure, example processes of the disclosure will now be discussed. It will be appreciated that each of the flowcharts depicts an example computer-implemented process that is performable by one or more of the apparatuses, systems devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates a flowchart depicting example operations of a process for determining at least one cropping parameter using an image raytracing function in accordance with at least one example embodiment of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as a configuration system embodied by the apparatus 250 that configures, and/or otherwise is associated with, the apparatus 200 alone or in communication with one or more other component(s), device(s), system(s), and/or the like. In this regard, in some such embodiments, the apparatus 250 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 250 is in communication with one or more external apparatus(es), system(s), device(s), and/or the like, to perform one or more of the operations as depicted and described. For example, the apparatus 250 in some embodiments is in communication with one or more external datastore(s), an external reader being configured, and/or the like. For purposes of simplifying the description, the process 700 is described as performed by and from the perspective of the apparatus 250.

The process 700 begins at operation 702. At operation 702, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that identifies ranging data associated with an imager. The ranging data represents a distance from the imager, or one or more component(s) thereof (e.g., an image sensor) to a target object, for example a machine-readable symbology within an environment. In some embodiments, the ranging data is identified via a rangefinder of the apparatus 250, and/or an associated device (e.g., an external rangefinder or a corresponding reader, such as the apparatus 200, utilized for performing part of the configuration process). Alternatively or additionally, in some embodiments, the ranging data is retrieved from one or more datastore(s). Alternatively or additionally, in some embodiments, the ranging data is received from an external device, for example via transmission.

At operation 704, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that identifies lens data associated with the imager. The lens data represents one or more optical characteristic(s) and/or parameter(s) associated with the imager. For example, in some embodiments, the imager includes one or more optical component(s) embodying a lens, where the lens data represents data value(s) for optical parameter(s) that define how the lens refracts and/or otherwise manipulates light interacting with the lens.

At operation 706, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that applies the ranging data and the lens data to an image raytracing function to generate constructed image data. In some embodiments, the image raytracing function calculates projections of ray traces representing the manipulation of light from a point on a machine-readable symbology to a point on an image sensor of the imager. In this regard, the image raytracing function may model the effects of the lens of the imager (e.g., based at least in part on the lens data) on such light as it reaches the image sensor at a particular range (e.g., based at least in part on the ranging data). It will be appreciated that any of a myriad of known image raytracing function(s) may be utilized, and/or a custom image raytracing function may be utilized.

In some embodiments, the constructed image data represents a portion of the image sensor for the imager that corresponds to a particular machine-readable symbology. For example the constructed image data may correspond to each point at which a ray trace from a point on a particular machine-readable symbology is determined to interact with an image sensor of the imager utilizing the image raytracing function. The constructed image data may be associated with a particular image area on the image sensor that represents the dimensions and/or other area defined by the constructed image data. In this regard, the constructed image data may correspond to a particular subset of the total image area capturable via the image sensor of the imager.

At operation 708, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that determines at least one cropping parameter based at least in part on the constructed image data. In some embodiments, the at least one cropping parameter is additionally or alternatively determined based at least in part on data associated with the image sensor of the imager. In some embodiments, the at least one cropping parameter is determined based at least in part on an algorithm relating the dimensions of the image sensor with the image area of the constructed image data. For example, in some embodiments, the at least one cropping parameter includes a multiplier to be applied to each dimension of the image sensor to generate image data of the same image area of the constructed image data. In some embodiments, the at least one cropping parameter includes a cropping parameter associated with each dimension of the image sensor. In some embodiments, the apparatus 250 identifies data indicating a size of an image sensor of the imager in one or more dimensions (e.g., as a resolution), and determines a ratio or percentage of the one or more particular dimension(s) of the constructed image data with the corresponding dimension(s) of the image sensor for the imager.

In some embodiments, the apparatus 250 maintains the at least one cropping parameter. Alternatively or additionally, in some embodiments, the apparatus 200 generates and/or otherwise maintains a range-parameter table that associates particular at least one cropping parameter with a corresponding range represented by ranging data. In this regard, the apparatus 250 may repeat the disclosed operations to generate the range-parameter table.

At optional operation 710, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that stores the at least one cropping parameter to a reader. In some embodiments, the reader is embodied by a specially configured apparatus, for example apparatus 200 In some embodiments, the apparatus 250 pushes the at least one cropping parameter to the reader during a configuration and/or production of the reader. It will be appreciated that, once the at least one cropping parameter is stored to the reader, the reader may utilize the at least one cropping dimension for cropping subsequently captured via the reader. Example operations for a reader cropping based at least in part on the cropping parameter are described further herein with respect to FIGS. 9 and 10.

FIG. 8 illustrates a flowchart depicting example operations of a process for determining at least one cropping parameter using an image magnification estimation function in accordance with at least one example embodiment of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as a configuration system embodied by the apparatus 250 that configures, and/or otherwise is associated with, the apparatus 200 alone or in communication with one or more other component(s), device(s), system(s), and/or the like. In this regard, in some such embodiments, the apparatus 250 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 250 is in communication with one or more external apparatus(es), system(s), device(s), and/or the like, to perform one or more of the operations as depicted and described. For example, the apparatus 250 in some embodiments is in communication with one or more external datastore(s), an external reader being configured, and/or the like. For purposes of simplifying the description, the process 800 is described as performed by and from the perspective of the apparatus 250.

The process 800 beings at operation 802. In some embodiments, the process 800 begins after one or more operations depicted and/or described with respect to any one of the other processes described herein. In this regard, some or all of the process 800 may replace or supplement one or more blocks depicted and/or described with respect to any of the processes described herein. Upon completion of the process 800, the flow of operations may terminate. Additionally or alternatively, as depicted, upon completion of the process 800 in some embodiments, flow may return to one or more operation(s) of another process, such as the operation 702. It will be appreciated that, in some embodiments, the process 800 embodies a sub-process of one or more other process(es) depicted and/or described herein, for example the process 700. Alternatively or additionally, in some embodiments the process 800 is performed in place of one or more iteration(s) of the process 700.

At operation 802, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that identify ranging data associated with an imager. The ranging data represents a distance from the imager, or one or more component(s) thereof (e.g., an image sensor) to a target object, for example a machine-readable symbology within an environment. In some embodiments, the ranging data is identified via a rangefinder of the apparatus 250, and/or an associated device (e.g., an external rangefinder or a corresponding reader, such as the apparatus 200, utilized for performing part of the configuration process). Alternatively or additionally, in some embodiments, the ranging data is retrieved from one or more datastore(s). Alternatively or additionally, in some embodiments, the ranging data is received from an external device, for example via transmission.

At operation 804, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that identify code size data associated with the imager. The code size data represents dimensions of a particular machine-readable symbology indicated as readable by a corresponding reader, for example embodied by an apparatus 200. In some embodiments, the code size data corresponds to a defined code size (e.g., in mils), a pixel size, and/or a size in another unit (e.g., inches, millimeters, and/or the like). In some embodiments, the code size data is received from an external device, for example from an apparatus 200 and/or an external data storage. Alternatively or additionally, in some embodiments, the apparatus 250 retrieves the code size data from a datastore. In some embodiments, the apparatus 250 identifies the code size data associated with the imager based at least in part on a particular identifier corresponding to the imager, the reader associated therewith, and/or the like, for example where each identifier is associated with a particular code size data corresponding to the largest code size readable by the identified reader. In some other embodiments, the apparatus 250 identifies the code size data by determining such code size data as stored data and/or receiving such stored data. In some embodiments, the apparatus 200 validates or confirms generated data (e.g., code size data, cropping parameter(s), and/or the like), utilizing a secondary edge detection process. In some embodiments, the apparatus 250 utilizes image processing on a captured image representation of a machine-readable symbology, for example by detecting edges of a machine-readable symbology utilizing edge detection, to confirm the code size data from the image representation.

In some embodiments, the apparatus 250 further identifies lens data associated with the imager for use. For example, in some embodiments, the apparatus 250 identifies user-inputted lens data for use in maintaining a simulation for performing at least one image magnification estimation function, as described herein. Alternatively or additionally, in some embodiments, the apparatus 250 identifies stored data representing lens data for a particular imager.

At operation 806, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that applies the ranging data and the code size data to an image magnification estimation function to generate estimated image data. In some embodiments, the image magnification estimation function embodies one or more algorithm(s) that estimates an image area of an image sensor utilized to represent a particular machine-readable symbology of a particular size, for example at a particular range from the machine-readable symbology. In this regard, the image magnification estimation function may model the magnification of a lens at a particular range to determine how machine-readable symbologies of a particular code size corresponding to the code size data is represented on an image sensor after such magnification. It will be appreciated that any of a myriad of known image magnification estimation function(s) may be utilized, and/or custom image magnification estimation function(s) may be utilized.

In some embodiments, the estimated image data represents dimensions of a portion of the image sensor for the imager that are estimated to represent at least a portion of the particular machine-readable symbology. For example the estimated image data may correspond to each point at which an image area of the image sensor estimated to represent the machine-readable symbology on the image sensor based on particular magnification by a particular lens associated with the image sensor. In this regard, the estimated image data may represent or correspond to a particular subset of the total image area capturable via the image sensor of the imager.

At operation 808, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that determines at least one cropping parameter based at least in part on the estimated image data. In some embodiments, the at least one cropping parameter is additionally or alternatively determined based at least in part on data associated with the image sensor of the imager. In some embodiments, the at least one cropping parameter is determined based at least in part on an algorithm relating the dimensions of the image sensor with the image area of the estimated image data. For example, in some embodiments, the at least one cropping parameter includes a multiplier to be applied to each dimension of the image sensor to generate image data of the same image area of the estimated image data. In some embodiments, the at least one cropping parameter includes a cropping parameter associated with each dimension of the image sensor. In some embodiments, the apparatus 250 identifies data indicating a size of an image sensor of the imager in one or more dimensions (e.g., as a resolution), and determines a ratio or percentage of the one or more particular dimension(s) of the estimated image data with the corresponding dimension(s) of the image sensor for the imager.

In some embodiments, the apparatus 250 maintains the at least one cropping parameter. Alternatively or additionally, in some embodiments, the apparatus 200 generates and/or otherwise maintains a range-parameter table that associates particular at least one cropping parameter with a corresponding range represented by ranging data. In this regard, the apparatus 250 may repeat the disclosed operations to generate the range-parameter table.

At optional operation 810, the apparatus 250 includes means such as the input identification circuitry 260, range identification circuitry 262, parameter generation circuitry 264, parameter maintenance circuitry 266, the communications circuitry 258, the input/output circuitry 256, the processor 252, and/or the like, or a combination thereof, that stores the at least one cropping parameter to a reader. In some embodiments, the reader is embodied by a specially configured apparatus, for example apparatus 200 In some embodiments, the apparatus 250 pushes the at least one cropping parameter to the reader during a configuration and/or production of the reader. It will be appreciated that, once the at least one cropping parameter is stored to the reader, the reader may utilize the at least one cropping dimension for cropping subsequently captured via the reader. Example operations for a reader cropping based at least in part on the cropping parameter are described further herein with respect to FIGS. 9 and 10.

FIG. 9 illustrates a flowchart depicting example operations of a process for cropping based on at least one cropping parameter in accordance with at least one example embodiment of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with a configuration system embodied by the apparatus 250 during a configuration process, and/or with one or more other component(s), device(s), system(s), and/or the like. In this regard, in some such embodiments, the apparatus 200 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 200 is in communication with one or more external apparatus(es), system(s), device(s), and/or the like, to perform one or more of the operations as depicted and described. For example, the apparatus 200 in some embodiments is in communication with one or more external datastore(s), an external reader being configured, and/or the like. For purposes of simplifying the description, the process 900 is described as performed by and from the perspective of the apparatus 200.

The process 900 beings at operation 902. In some embodiments, the process 900 begins after one or more operations depicted and/or described with respect to any one of the other processes described herein, such as after operation 710 and/or 810 as depicted and described herein. In this regard, some or all of the process 900 may replace or supplement one or more blocks depicted and/or described with respect to any of the processes described herein. Upon completion of the process 900, the flow of operations may terminate. Additionally or alternatively, as depicted, upon completion of the process 900 in some embodiments, flow may return to one or more operation(s) of another process, such as the operation 902. It will be appreciated that, in some embodiments, the process 900 embodies a sub-process of one or more other process(es) depicted and/or described herein, for example the process 700 and/or 800.

At operation 902, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that receives a captured image. In some embodiments, the captured image is received via an imager. For example, the imager in some embodiments includes an image sensor aligned with one or more optical component(s) that defines a field of view capturable by the image sensor. In this regard, the captured image may represent light attenuated on the image sensor of the imager having traversed through the lens of the imager. At least a portion of the captured image may include a representation of a machine-readable symbology. In some embodiments, the imager includes or is associated with a laser aimer utilized to align orientation of the imager with the machine-readable symbology to be captured.

At operation 904, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that identifies at least one cropping parameter associated with the imager. In some embodiments, the apparatus 200 maintains the at least one cropping parameter in a memory or datastore accessible to the apparatus 200. In some such embodiments, the apparatus 200 retrieves the at least one cropping parameter from the datastore and/or memory for use upon receiving the captured image. Alternatively or additionally, in some embodiments, the apparatus 200 identifies a predefined at least one cropping parameter.

In some embodiments, the apparatus 200 identifies the at least one cropping parameter via a range-parameter table. The range-parameter table may include at least one cropping parameter associated with various ranging data, each ranging data representing a different range of a plurality of ranges represented in the range-parameter table. In some embodiments, the apparatus 200 identifies a range at which the captured image was captured. For example, in some embodiments, the apparatus 200 receives ranging data representing the range at which the captured image was captured. The ranging data may be received from a rangefinder of the apparatus 200, for example. Alternatively or additionally, in some embodiments, the apparatus 200 includes a laser aimer utilized to detect and/or otherwise determine the ranging data. In this regard, the at least one cropping parameter may be identified from the range-parameter table, for example by retrieving the at least one cropping parameter stored associated with the ranging data identified via the apparatus 200, and/or stored associated with other ranging data closest to the ranging data identified via the apparatus 200, or otherwise determined to be utilized based on another algorithm for selecting a record from the range-parameter table (e.g., selecting the record from the range-parameter table that has the lowest corresponding ranging data that exceeds the ranging data identified by the apparatus 200 as associated with the captured image). It will be appreciated that, in some embodiments, the apparatus 200 maintains the range-parameter table, for example set via one or more of the process(es) 700 and/or 800 as depicted and described herein.

At operation 906, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that crops the captured image. The apparatus 200 crops the captured image to generate a cropped image, for example where the cropped image includes at least a portion of the whole of the captured image. In some embodiments, the apparatus 200 crops the captured image based at least in part on the at least one cropping parameter identified for use, for example at operation 904. For example, in some embodiments, the apparatus 200 crops the captured image based at least in part on the at least one cropping parameter by cropping a certain amount of data from the edges of the captured image, where the amount of data cropped is determinable based at least in part on the at least one cropping parameter. In some embodiments, the at least one cropping parameter includes a single cropping parameter applied to each dimension of the captured image (e.g., a percentage parameter having the value of 0.2, such that all but 20% of the image is cropped in each dimension). Alternatively, in some embodiments the at least one cropping parameter includes a plurality of cropping parameters, each associated with and utilized to crop a particular dimension of the captured image (e.g., a percentage parameter having the value of 0.4 for the height of the captured image, and a percentage parameter having the value of 0.5 for the width of the captured image). It will be appreciated that any different dimension may be associated with the same cropping parameter, or different cropping parameters (e.g., a different cropping parameter for cropping from each of a top of the captured image, a left of the captured image, a bottom of the captured image, and a right of the captured image).

At operation 908, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that applies the cropped image to an image deconvolution algorithm. The deconvolution algorithm generates a processed image from the cropped image. In some embodiments, the deconvolution algorithm processes the cropped image to enhance clarity or otherwise alter one or more aspect(s) of the captured image before subsequent image processing (e.g., in preparation for attempting a particular image processing task). In some embodiments, the image deconvolution algorithm clarifies one or more aspect(s) of the cropped image to enhance decodable element(s) of a machine-readable symbology represented therein. For example, the image deconvolution algorithm may increase the clarity of one or more bars of a captured representation of a barcode, visually sharpen distinguishable points of a QR code, and/or the like. It will be appreciated that any of a myriad of known image deconvolution algorithms, and/or custom deconvolution algorithms, may be utilized.

In some embodiments, the image deconvolution algorithm is embodied by or includes a lens point spread function corresponding to a particular lens of the apparatus 200. In this regard, the lens point spread function may be utilized to improve or remove image blurs from a captured image regardless of the design of the lens. For example, in a circumstance where the lens is designed having strong aberrations, the lens point spread function may still be utilized during deconvolution to greatly improve image blur while still retaining the large depth of field provided by such a lens design. In some embodiments, the lens point spread function is maintained by the apparatus 200, predefined, and/or the like, for example as part of lens data accessible or maintained by the apparatus 200.

Applying the cropped image to the image deconvolution algorithm provides a myriad of advantages over applying the entire captured image. For example, as the cropped image is processable faster than the full-size captured image without any cropping. In this regard, the apparatus 200 processes the cropped image with increased throughput and reduced use of computing resources (e.g., processor and memory usage).

At optional operation 910, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that outputs the processed image to an image processing algorithm. For example, in some embodiments the apparatus 200 outputs the processed image to an image processing algorithm that performs a particular image processing task, and for example that outputs results data indicating whether the image processing task was successfully completed. In some embodiments, the image processing algorithm is performed on the apparatus 200. In some embodiments, the image processing algorithm is performed on an external system, for example by the apparatus 200 outputting the processed image to the external system for further processing, for example via transmission to the external system. In some embodiments, the apparatus 200 outputs, transmits, and/or otherwise displays the results of the image processing algorithm.

In some embodiments, the apparatus 200 outputs the processed image to an image processing algorithm that attempts to detect and decode a machine-readable symbology represented in the processed image. The image processing algorithm may be any of a myriad of known image processing algorithm(s) and/or custom image processing algorithm(s) that detect and/or decode the machine-readable symbology represented therein, including barcode detection and/or decoding algorithm(s), QR code detection and/or decoding algorithm(s), and/or the like. It will be appreciated that, as the processed image is generated from the cropped image, it similarly is processable in a more efficient manner and with less computing resources than processing the corresponding full captured image post-deconvolution.

FIG. 10 illustrates a flowchart depicting example operations of a process for identifying at least one cropping parameter based on a variable focus in accordance with at least one example embodiment of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with a configuration system embodied by the apparatus 250 during a configuration process, and/or with one or more other component(s), device(s), system(s), and/or the like. In this regard, in some such embodiments, the apparatus 200 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 200 is in communication with one or more external apparatus(es), system(s), device(s), and/or the like, to perform one or more of the operations as depicted and described. For example, the apparatus 200 in some embodiments is in communication with one or more external datastore(s), an external reader being configured, and/or the like. For purposes of simplifying the description, the process 1000 is described as performed by and from the perspective of the apparatus 200.

The process 1000 beings at operation 1002. In some embodiments, the process 1000 begins after one or more operations depicted and/or described with respect to any one of the other processes described herein. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process, such as the operation 902. It will be appreciated that, in some embodiments, the process 1000 embodies a sub-process of one or more other process(es) depicted and/or described herein, for example the process 700. Alternatively or additionally, in some embodiments the process 800 is performed in place of one or more iteration(s) of the process 900.

At operation 1002, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that alters a current focus of a lens associated with an imager. For example, in some embodiments the apparatus 200 includes the imager with a variable focus lens. In this regard, the lens and/or one or more other component(s) of the apparatus 200 may adjust positions to alter a focal length defining the current focus of the lens associated with the imager. In this regard, the lens may be moved to alter the field of view capturable by the imager, and/or the clarity at particular range(s) in the field of view. The apparatus 200 may alter the current focus in any of a myriad of manners, including magnetizing forces to reposition the lens, electronically re-positioning the lens and/or another component of the imager, and/or the like. It will be appreciated that in some embodiments, the apparatus 200 may track and/or be configured to enable determination of lens data representing the current focus of the lens associated with the imager.

At operation 1004, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that identifies at least one cropping parameter based at least in part on the current focus of the lens. In some embodiments, for example, the current focus is included as lens data maintained by the apparatus 200. The lens data maintained by the apparatus 200 may be inputted to a function, for example an image raytracing function and/or an image magnification estimation function, utilized to generate the data from which at least one cropping parameter is derivable. In this regard, as the current focus of the lens of the imager is updated to a new value, the apparatus 200 may determine different at least one cropping parameter for each updated current focus.

Other Imager Arrangements of the Disclosure

It should be appreciated that other embodiments may utilize different imager arrangements. Such imager(s) may be arranged including any number of additional and/or alternative component(s). Different imager arrangement(s) may be associated with different field(s) of view, focal range(s), and/or the like. In this regard, it will be appreciated that such different imager arrangement(s) may similarly be differently impact how an image is captured by an image sensor thereof, for example having different optical aberration(s) affecting the resulting image captured by an image sensor.

It should be appreciated that in some embodiments, one or more aspects of the embodiments are particularly designed to the aspect(s) of the imager(s) to be utilized and/or particular subcomponents thereof, for example particularities of the lens(es) of the image, image sensor type and/or configuration, and/or the like. Different imager arrangements may have different optical effects on incoming light that interacts with the image sensor thereof. In some such embodiments, different particular optical characteristics may be utilized to generate particular process(es) for configuring that imager and/or process image(s) captured via the imager. In some embodiments for example, the lens point spread function associated with a particular imager is utilized during image deconvolution to improve or otherwise resolve the particular optical aberrations caused by the particular imager as configured.

Example Processes for Improving Image Clarity Via Image Processes of the Disclosure FIG. 11 illustrates an example visualization of deblurring of an image utilizing deconvolution process(es) in accordance with at least one example embodiment of the present disclosure. Specifically, FIG. 11 depicts an example image 1102 captured via an imager. In some embodiments, the image 1102 is captured via the imager 300 and/or another imager arrangement as depicted and described herein. As depicted, the image 1102 may represent the image data as captured, and before any subsequent image processing (e.g., for cropping, deconvolution, and/or other processing). As illustrated, the image 1102 is depicted including optical aberration(s), for example causing a significant blur of the representation of the target object captured within the field of view by the imager.

The raw image data represented by the image 1102 is processable via one or more process(es) to reduce the effects of the optical aberrations, for example to improve the clarity of the image at one or more locations and/or portions of the image. For example, in some embodiments, the image 1102 is processable via one or more of the process(es) 7-10 and/or 13-16 herein to improve the visual clarity of the representation. Such process(es) produce a resulting processed image, for example the image 1104. As illustrated, the image 1104 includes significantly improved clarity than the corresponding image 1102 from which it was generated, for example by reducing the effects of such aberration(s) and/or otherwise compensating accordingly via the process(es) described herein. In some embodiments, the image 1102 is processed to generate the corresponding image 1104 via a process utilizing particular image cropping, downsampling, and/or deconvolution as described herein with respect to FIGS. 12-15, for example.

FIG. 12 illustrates an example of edge detection for image cropping in accordance with at least one example embodiment of the present disclosure. Specifically, FIG. 12 depicts an image 1200 together with depicted edges representing boundary lines utilized for cropping the image 1200. In this regard, the boundary lines may represent delineated point(s) within the image 1200 utilized to crop to a particular portion of the image 1200, for example to improve isolation of a machine-readable symbology within the image 1200 based on detected edge(s). In some embodiments, the edge detection process(es) performed herein are utilized to confirm and/or enhance cropping parameter generation as depicted and described herein with respect to FIGS. 3-10. For example, edge detection may be utilized by the apparatus 250 to confirm the image areas determined for use in generating the cropping parameter(s) for a particular imager arrangement.

In some embodiments, the image 1200 is processed to identify two edges in each of a vertical direction of the image 1200 and a horizontal direction of the image 1200. The boundary lines as depicted include a top edge 1204A and a bottom edge 1204B, for example. The top edge 1204A defines a top line (e.g., a vertical or y-coordinate value) at which an edge is detected in the image 1200. Similarly, the bottom edge 1204B defines a bottom line (e.g., a second vertical or lower y-coordinate value, or higher y-coordinate value in other coordinate systems) at which another edge is detected. In this regard, the top edge 1204A and the bottom edge 1204B may define a vertical bounding box utilized to crop a particular vertical portion of the image 1200, for example by cropping out particular portion(s) of the image above the top edge 1204A and/or below the bottom edge 1204B. In some embodiments, one or more Sobel filter(s) is applied along the y-axis of the image 1200 to identify the top edge 1204A and/or bottom edge 1204B. It will be appreciated that any of a myriad of other know and/or edge-detection algorithm(s) may be applied in other embodiments.

The boundary lines as depicted further include a left edge 1202A and right edge 1202B, for example. The left edge 1202A defines a left-most line (e.g., a horizontal or x-coordinate value) at which an edge is detected in the image 1200. Similarly, the right edge 1202B defines a right line (e.g., a second horizontal or higher x-coordinate, or lower x-coordinate value in other coordinate systems) at which another edge is detected. In this regard, the left edge 1202A and the right edge 1202B may define a horizontal bounding box utilized to crop a particular horizontal portion of the image 1200, for example by cropping out particular portion(s) of the image to the left of the left edge 1202A and/or to the right of the right edge 1202B. In some embodiments, one or more Sobel filter(s) is applied along the x-axis of the image 1200 to identify the left edge 1202A and/or right edge 1202B. It will be appreciated that any of a myriad of other know and/or edge-detection algorithm(s) may be applied in other embodiments.

Utilizing the various boundary lines, a particular sub-portion of the image 1200 is defined. For example, a portion of the image 1200 falls within the inner portion of the bounding box defined by the top edge 1204A, right edge 1202B, bottom edge 1204B, and left edge 1202A. In this regard, such an inner portion of the image 1200 may be extracted by cropping out the remaining portions of the image. The inner portion of the image 1200 may subsequently be further processed, for example as part of subsequent steps of an image processing task. It will be appreciated as described herein that such cropping improves the overall efficiency, speed, and throughput of the image processing task as described herein, for example by reducing the amount of data requiring processing and thereby reducing the amount of computing resources and/or time required for such processing.

FIG. 13 illustrates a flowchart depicting example operations of a process for image processing in accordance with at least one example embodiment of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as a configuration system embodied by the apparatus 250 that configures, and/or otherwise is associated with, the apparatus 200 alone or in communication with one or more other component(s), device(s), system(s), and/or the like. In this regard, in some such embodiments, the apparatus 250 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 200 is in communication with one or more external apparatus(es), system(s), device(s), and/or the like, to perform one or more of the operations as depicted and described. For purposes of simplifying the description, the process 1300 is described as performed by and from the perspective of the apparatus 200.

The process 1300 begins at operation 1302. At operation 1302, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that acquires an image. In some embodiments, the apparatus 200 acquires an image captured from an imaging engine. In this regard, the image acquired in some embodiments represents raw image data that may be affected by one or more aberration(s) that diminish the visual clarity of such raw image data. In some embodiments, the image is acquired via an imager arranged in accordance with the imager 1100 as depicted and described herein.

At operation 1304, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that performs image cropping and, optionally, downsampling. The image cropping and/or downsampling may generate a processed image for further processing. Such image cropping and downsampling may be performed on the image acquired at operation 1302. In some embodiments, the apparatus 200 performs image cropping utilizing edge detection to crop out all portions of the acquired image that do not fall within a boundary defined via edge detection. Example processes are described herein, including the edge detection described with respect to FIG. 14.

In some embodiments, the downsampling performed to reduce the dimensionality and/or data of the acquired image. The cropping represents the downsampling in some embodiments. Additionally or alternatively, in some embodiments, the downsampling is performed to reduce the image size and/or dimensionality before cropping. In some embodiments, the downsampling is performed to reduce the image size and/or dimensionality after cropping. In some embodiments, any of a myriad of known and/or custom downsampling algorithm(s) may be utilized to perform the described downsampling. In some embodiments, the downsampling is optional, such that in some circumstances downsampling is not needed. For example, the downsampling may not be performed in some circumstances where the apparatus 200 determines that the machine-readable symbology takes up a certain threshold area of the acquired image.

At operation 1306, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that performs image deconvolution. The image deconvolution generates a further processed image, for example a clarified image. In some embodiments, the deconvolution algorithm performs deblurring and/or image restoration that improve the image clarity of the processed image. In some embodiments, the image deconvolution is performed as described with respect to FIG. 15.

At operation 1308, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that processes the clarified image generated from deconvolution. In some embodiments, the decoder processes image data of the clarified image to attempt to detect and/or decode at least one machine-readable symbology therein. Non-limiting examples of a decoder include a barcode processing algorithm, a QR code processing algorithm, and/or the like. In some embodiments, the decoder generates decoded data in a circumstance where a machine-readable symbology was successfully detected and decoded from the clarified image. Alternatively or additionally, in some embodiments, the decoder generates and/or outputs an indication representing a failed decoding in a circumstance where no machine-readable symbology was successfully detected and/or decoded.

At operation 1310, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that performs an output. In some embodiments, the apparatus 200 outputs the decoded data generated via the decoder. The apparatus 200 may output such data via a display of or otherwise associated with the apparatus 200. Alternatively or additionally, in some embodiments the apparatus 200 outputs the decoded data by transmitting it to an external device and/or system for further processing and/or display.

FIG. 14 illustrates a flowchart depicting example operations of a process for image cropping as part of a process for image processing in accordance with at least one example embodiment of the present disclosure. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as a configuration system embodied by the apparatus 250 that configures, and/or otherwise is associated with, the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 200 is in communication with one or more external apparatus(es), system(s), device(s), and/or the like, to perform one or more of the operations as depicted and described. For purposes of simplifying the description, the process 1400 is described as performed by and from the perspective of the apparatus 200.

The process 1400 beings at operation 1402. In some embodiments, the process 1400 begins after one or more operations depicted and/or described with respect to any one of the other processes described herein. In this regard, some or all of the process 1400 may replace or supplement one or more blocks depicted and/or described with respect to any of the processes described herein. Upon completion of the process 1400, the flow of operations may terminate. Additionally or alternatively, as depicted, upon completion of the process 1400 in some embodiments, flow may return to one or more operation(s) of another process, such as the operation 1306. It will be appreciated that, in some embodiments, the process 1400 embodies a sub-process of one or more other process(es) depicted and/or described herein, for example the process 1300. Alternatively or additionally, in some embodiments the process 1400 is performed in place of one or more iteration(s) of the process 1300.

At operation 1402, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that edges an acquired image. The edge detection in some embodiments defines a row value corresponding to a horizontal edge detected in the image, and/or defines a column value corresponding to a vertical edge detected in the image. The edging process may detect edges within the acquired image. In some embodiments, the edging process detects vertical edges and/or horizontal edges associated with a machine-readable symbology based at least in part on changes in intensity values within the image. Alternatively or additionally, in some embodiments, the edging process detects other changes in the acquired image that represent an edge in a vertical direction and/or horizontal direction. It will be appreciated that any of a myriad of known and/or custom edge detection algorithms may be utilized.

At operation 1404, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that performs an energy calculation. In some embodiments, the energy calculation process determines the energy levels and/or intensity of the image data within the edges defined at operation 1406. In some embodiments, the energy calculation process identifies the energy level at different points within the edged portion of the image.

At operation 1406, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that identifies a machine-readable symbology region. The machine-readable symbology region in some embodiments is defined based at least in part on the energy levels determined at operation 1404. In some embodiments, the machine-readable symbology region is determined as corresponding to locations within the edged region that are associated with energy levels that satisfy a particular energy level threshold (e.g., by exceeding the particular energy level threshold). In some embodiments, the energy level threshold is determinable. Alternatively or additionally, in some embodiments, the image is processed into binary energy levels during the energy calculation, such that the image may be processed based on the binary indicator at each location (e.g., indicating a dark spot or a light spot) to identify the region corresponding to the machine-readable symbology. In some embodiments, the machine-readable symbology embodies a barcode, such that the apparatus 200 determines a barcode region that defines the area within the image that represents a particular portion of the barcode.

At operation 1408, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that determines whether the machine-readable symbology area exceeds a particular threshold portion of the image area. In some embodiments, the apparatus 200 compares the area of the machine-readable symbology area with a particular percentage area of the total acquired image. In some embodiments, the apparatus 200 maintains or otherwise identifies a particular data parameter representing a percentage that defines the threshold portion of the image area to be satisfied. For example, the apparatus 200 may maintain or identify a percentage threshold of 60%, such that the apparatus 200 determines whether the machine-readable symbology region exceeds 60% of the total image area being processed.

In circumstances where the determination at operation 1408 indicates that the machine-readable symbology region satisfies the threshold portion of the image area, flow proceeds to operation 1410. At operation 1410, the apparatus 200 includes means such as the imaging engine 210, ranging circuitry 212, image cropping circuitry 214, image processing circuitry 216, the communications circuitry 208, the input/output circuitry 206, the processor 202, and/or the like, or a combination thereof, that performs downsampling. In some embodiments, the apparatus 200 performs the downsampling to reduce the total image data represented in the image being processed. In some embodiments, the downsampled image is generated via one or more known or custom downsampling algorithm(s).

In circumstances where the determination at operation 1408 indicates that the machine-readable symbology region does not satisfy the threshold portion of the image area, flow proceeds to the end of the process 1400. The resulting image—for example the edged image determined to fall below the threshold portion of the total image area or the downsampled image resulting from operation 1410—may be further processed as described with respect to FIG. 13, for example to perform image deconvolution and/or machine-readable symbology detection and processing.

FIG. 15 illustrates a flowchart depicting example operations of a process for image deconvolution as part of a process for image processing in accordance with at least one example embodiment of the present disclosure. Specifically, FIG. 15 depicts operations of an example process 1500. In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as a configuration system embodied by the apparatus 250 that configures, and/or otherwise is associated with, the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in a memory and/or another component depicted and/or described herein and/or otherwise accessible to the configuration system, for performing the operations as depicted and described. In some embodiments, the configuration system embodied by the apparatus 200 is in communication with one or more external apparatus(es), system(s), device(s), and/or the like, to perform one or more of the operations as depicted and described. For purposes of simplifying the description, the process 1500 is described as performed by and from the perspective of the apparatus 200. The process 1500 begins after one or more operations depicted and/or described with respect to any one of the other processes described herein. In this regard, some or all of the process 1500 may replace or supplement one or more blocks depicted and/or described with respect to any of the processes described herein. Upon completion of the process 1500, the flow of operations may terminate. Additionally or alternatively, as depicted, upon completion of the process 1500 in some embodiments, flow may return to one or more operation(s) of another process, such as the operation 1308. It will be appreciated that, in some embodiments, the process 1500 embodies a sub-process of one or more other process(es) depicted and/or described herein, for example the process 1300. Alternatively or additionally, in some embodiments the process 1500 is performed in place of one or more iteration(s) of the process 1300.

The apparatus 200 receives a cropped area of interest 1502. In some embodiments, the cropped area of interest 1502 corresponds to at least a portion of an input image captured by an image sensor of an imager. In some embodiments, the cropped area of interest 1502 embodies a cropped image from the input image that is cropped utilizing any of the image cropping algorithm(s) described herein, for example utilizing cropping parameter(s) from raytracing process(es), image size estimation process(es), edge detection process(es), and/or the like. In this regard, the cropped area of interest 1502 in some embodiments represents a sub-image of the input image for further processing, which may be extracted to a separate image or defined by data boundaries of the input image to identify the cropped area of interest 1502 in-place within the input image.

The apparatus 200 processes the cropped area of interest 1502 utilizing a deconvolution process 1504. In some embodiments, the deconvolution process 1504 improves image clarity, resolution, or otherwise sharpens an image. In some embodiments, the deconvolution process 1504 utilizes one or more data value(s) and/or data object(s) maintained by the apparatus 200 for such image deconvolution, for example a distance estimated or measured associated with the distance at which the input image was captured, a particular filter to be applied to during image deconvolution, image sensor settings (e.g., gain) associated with the image sensor that captured the input image, and/or the like. It will be appreciated that any known and/or customized deconvolution process 1504 may be utilized by the apparatus 200.

Via the deconvolution process 1504, the apparatus 200 generates the output image 1506. In some embodiments, the output image 1506 embodies the cropped area of interest 1502 with improved image clarity via the deconvolution process 1504. For example, in some embodiments, the output image 1506 includes a clarified, deblurred, increased resolution, or otherwise sharpened representation of the data in the cropped area of interest 1502. In some embodiments, the output image 1506 is output for further processing. For example, in some embodiments, the output image 1506 is output for further processing via a process for attempting to read machine-readable symbology(s) therein, for example by attempting detecting and/or decoding of machine-readable symbologies by one or more image processing algorithm(s).

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for geometric image cropping, the apparatus comprising at least one processor and at least one non-transitory memory including computer-coded instructions thereon, the computer-coded instructions, with the at least one processor, cause the apparatus to:
   receive a captured image via an imager;
   identify at least one cropping parameter associated with the imager, wherein the at least one cropping parameter comprises ranging data that is indicative of a distance between the imager and a target object, wherein the captured image shows the target object;
   crop the captured image based at least in part on the at least one cropping parameter to generate a cropped image; and
   apply the cropped image to an image deconvolution algorithm to generate a processed image.

2. The apparatus according to claim 1, the apparatus further caused to:
   output the processed image to an image processing algorithm, wherein the image processing algorithm comprises a machine-readable symbology reading algorithm.

3. The apparatus according to claim 1, the apparatus further caused to:
   alter a current focus of a lens associated with the imager; and
   identify the at least one cropping parameter based at least in part on the current focus of the lens.

4. The apparatus according to claim 1, wherein to identify the at least one cropping parameter associated with the imager, the apparatus is caused to:
   receive the at least one cropping parameter from an external system configured to:
   identify the ranging data associated with the imager;
   identify lens data associated with the imager;
   apply the ranging data and the lens data to an image raytracing function to generate constructed image data; and
   determine the at least one cropping parameter based at least in part on the constructed image data.

5. The apparatus according to claim 1, the apparatus further caused to:
   store the at least one cropping parameter to a range-parameter table.

6. The apparatus according to claim 1, wherein to identify the at least one cropping parameter associated with the imager, the apparatus is caused to:
   receive the at least one cropping parameter from an external system configured to:
   identify the ranging data associated with the imager;
   identify code size data associated with the imager;
   apply the ranging data and the code size data to an image magnification estimation function to generate estimated image data; and
   determine the at least one cropping parameter based at least in part on the estimated image data.

7. The apparatus according to claim 1, wherein the image deconvolution algorithm comprises a lens point spread function.

8. The apparatus according to claim 1, wherein to identify the at least one cropping parameter associated with the imager, the apparatus is caused to:

identify the ranging data associated with the imager; and
determine, from a range-parameter table, the at least one cropping parameter.

9. The apparatus according to claim 1, the at least one cropping parameter based at least in part on a largest code size readable via the apparatus.

10. The apparatus according to claim 1, wherein the at least one cropping parameter is based at least in part on an aimer position.

11. The apparatus according to claim 1, wherein the imager comprises at least one lens, and wherein the at least one cropping parameter is based at least in part on lens data associated with the at least one lens.

12. A computer-implemented method comprising:
receiving a captured image via an imager;
identifying at least one cropping parameter associated with the imager, wherein the at least one cropping parameter comprises ranging data that is indicative of a distance between the imager and a target object, wherein the captured image shows the target object;
cropping the captured image based at least in part on the at least one cropping parameter to generate a cropped image; and
applying the cropped image to an image deconvolution algorithm to generate a processed image.

13. The computer-implemented method according to claim 12, the computer-implemented method further comprising:
outputting the processed image to an image processing algorithm, wherein the image processing algorithm comprises a machine-readable symbology reading algorithm.

14. The computer-implemented method according to claim 13, the computer-implemented method further comprising:
altering a current focus of a lens associated with the imager; and
identifying the at least one cropping parameter based at least in part on the current focus of the lens.

15. The computer-implemented method according to claim 13, wherein identifying the at least one cropping parameter associated with the imager comprises:
receiving the at least one cropping parameter from an external system configured for:
identifying the ranging data associated with the imager;
identifying lens data associated with the imager;
applying the ranging data and the lens data to an image raytracing function to generate constructed image data; and
determining the at least one cropping parameter based at least in part on the constructed image data.

16. The computer-implemented method according to claim 13, the computer-implemented method further comprising:
storing the at least one cropping parameter to a range-parameter table.

17. The computer-implemented method according to claim 13, wherein identifying the at least one cropping parameter associated with the imager comprises:
receiving the at least one cropping parameter from an external system configured for:
identifying the ranging data associated with the imager;
identifying code size data associated with the imager;
applying the ranging data and the code size data to an image magnification estimation function to generate estimated image data; and
determining the at least one cropping parameter based at least in part on the estimated image data.

18. The computer-implemented method according to claim 13, wherein identifying the at least one cropping parameter associated with the imager comprises:
identifying the ranging data associated with the imager; and
determining, from a range-parameter table, the at least one cropping parameter.

19. A computer program product comprising at least one non-transitory computer-readable storage medium having computer program code stored thereon that, in execution with at least one processor, configures the computer program product for:
receiving a captured image via an imager;
identifying at least one cropping parameter associated with the imager, wherein the at least one cropping parameter comprises ranging data that is indicative of a distance between the imager and a target object, wherein the captured image shows the target object;
cropping the captured image based at least in part on the at least one cropping parameter to generate a cropped image; and
applying the cropped image to an image deconvolution algorithm to generate a processed image.

20. The computer program product according to claim 19, the computer program product further configured for:
outputting the processed image to an image processing algorithm, wherein the image processing algorithm comprises a machine-readable symbology reading algorithm.

* * * * *